United States Patent [19]
Tomita

[11] Patent Number: 6,049,793
[45] Date of Patent: Apr. 11, 2000

[54] SYSTEM FOR BUILDING AN ARTIFICIAL NEURAL NETWORK

[76] Inventor: Kenichi Tomita, 413 Shetland Dr., Williamsville, N.Y. 14221

[21] Appl. No.: 08/970,050

[22] Filed: Nov. 13, 1997

Related U.S. Application Data

[60] Provisional application No. 60/031,065, Nov. 15, 1996.

[51] Int. Cl.[7] .............................. G06N 3/02; G06N 5/00
[52] U.S. Cl. .............................................. 706/17; 706/20
[58] Field of Search ................................. 706/20, 25, 15, 706/27, 17

[56] References Cited

U.S. PATENT DOCUMENTS

| | | | |
|---|---|---|---|
| 5,005,206 | 4/1991 | Naillon et al. | 382/253 |
| 5,019,858 | 5/1991 | Suzuki et al. | 355/35 |
| 5,103,488 | 4/1992 | Gemello et al. | 382/199 |
| 5,134,396 | 7/1992 | Sirat et al. | 341/51 |
| 5,204,718 | 4/1993 | Morita | 399/74 |
| 5,263,097 | 11/1993 | Katz et al. | 382/48 |
| 5,276,771 | 1/1994 | Manukian et al. | 706/25 |
| 5,299,284 | 3/1994 | Roy | 706/25 |
| 5,361,201 | 11/1994 | Jost et al. | 705/35 |
| 5,361,326 | 11/1994 | Aparicio IV | 706/44 |
| 5,420,963 | 5/1995 | Kuwata | 706/22 |
| 5,438,629 | 8/1995 | Moed et al. | 706/25 |
| 5,452,399 | 9/1995 | Moed | 706/20 |
| 5,544,256 | 8/1996 | Brecher et al. | 706/900 |
| 5,619,593 | 4/1997 | Takamatsu et al. | 356/357 |
| 5,657,487 | 8/1997 | Doner | 455/456 |
| 5,664,067 | 9/1997 | Moed et al. | 706/25 |
| 5,796,924 | 8/1998 | Errico et al. | 706/25 |
| 5,854,993 | 3/1999 | Grichnik | 702/54 |

OTHER PUBLICATIONS

G. S. Rogers, Matrix Derivatives, Marcel Dekker, Inc., "Examples of Optimization," pp. 93–100, 1980.

S.L. Campbell and C.D. Meyer, Jr., "Generalized Inverses of Linear Transformations", Dover Pub., Inc., pp. 8–15, 104–115, 1979.

P. Peretto, "An Introduction to the Modeling of Neural Networks", Cambridge University Press, pp. 230–249, 1992.

G. Barrie Wetherill, "Regression Analysis with Applications", Champman and Hall, pp. 10–13, 1986.

T. Kohonen, "Self Organization and Associative Memory", Berlin Heidelberg New York tokyo, 1984, pp. 14–21, pp. 178–188.

J. Bibby et al., "Prediction and Improved Estimation in Linear Models", John Wiley & Sons, pp. 6–9, pp. 75–81, 1977.

(List continued on next page.)

*Primary Examiner*—Tariq R. Hafiz
*Assistant Examiner*—Michael Pender
*Attorney, Agent, or Firm*—Kenneth J. Lukacher

[57] ABSTRACT

A system for building an artificial neural network is provided which precisely defines the network's structure of artificial neurons, and non-iteratively determines the synapse-weights and hard limiter threshold of each artificial neuron of the network. The system includes a computer for analyzing input data, which represents patterns of different classes of signals, to generate one or more data points in two or three dimensions representative of the signals in each of the different classes. A distribution of the data points is visualized on a map on an output device coupled to the computer. The data points are clustered on the map into clusters in accordance with the classes associated with the data points, and the map is then partitioned into regions by defining linear boundaries between clusters. The artificial neural network is configured in accordance with the data points, clusters, boundaries, and regions, such that each boundary represents a different artificial neuron of the artificial neural network, and the geometric relationship of the regions on the map to the classes defines the logic connectivity of the artificial neurons. The synaptic weights and threshold of each artificial neuron in the network are graphically determined based on the data points of the map.

40 Claims, 14 Drawing Sheets

OTHER PUBLICATIONS

Frank Rosenblatt, "Principles of Neurodynamics", Spartan Books, pp. 78–151, 1959.

D.E. Rumelhart et al., Parallel Distributed Processing: Explorations i the Microstructures of Cognitition Learning internal representations by error propagation, vol. 1, MIT Press, pp. 318–362, 1980.

J. R. Magnus et al., "Matrix Differential Calculus with Applications in Statistics and Econometrics", John Wiley & Sons, pp. 32–39, 56–62, 130–143, 1988.

S. Amari, "Meural Theory of Association and concept–Formation", Biological Cybernetics, pp. 175–185, 1977.

S. Amari, Mathematics in Neural Networks, (1991) in Japanese.

E.B. Baum, "Neural Net Algorithms that Learn in Polynomial Time from Examples and Queries," IEEE Tran. on Neural Networks, vol. 2 (1), pp. 5–19, Jan. 1991.

E.B. Baum and K.J. Lang, "Constructing Hidden Units using Examples and Queries," Advances in Neural Information Processing Systems 3, Morgan Kaufmann Publishers, pp. 904–910, Dec. 1991.

Shin–Yee Lu, "Pattern Classification Using Self–Organiation Feature Maps", IEEE ICNN 1990.

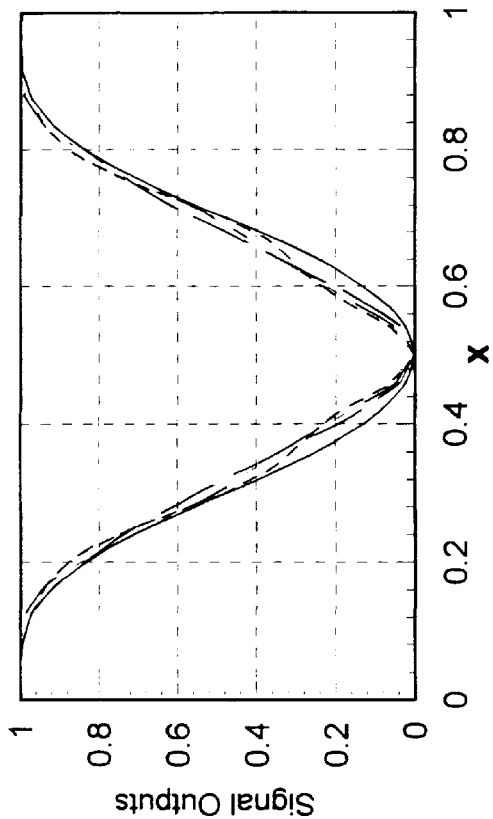
FIG. 9-A1 Pattern Group A1
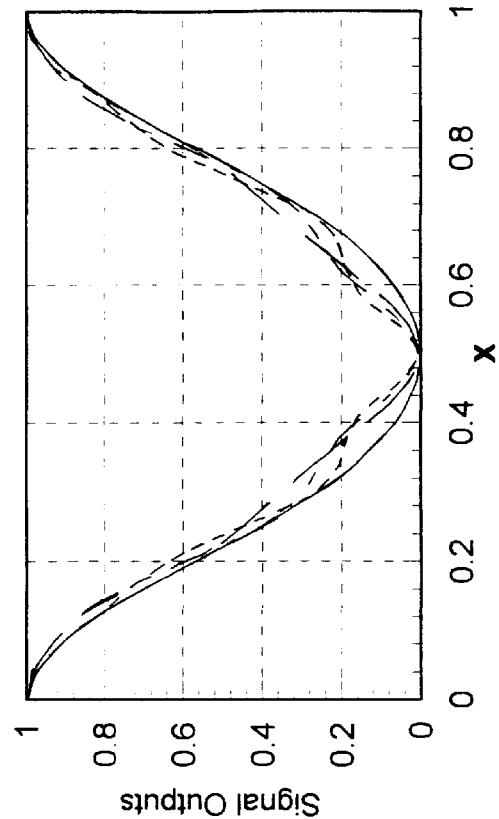
FIG. 9-A2 Pattern Group A2
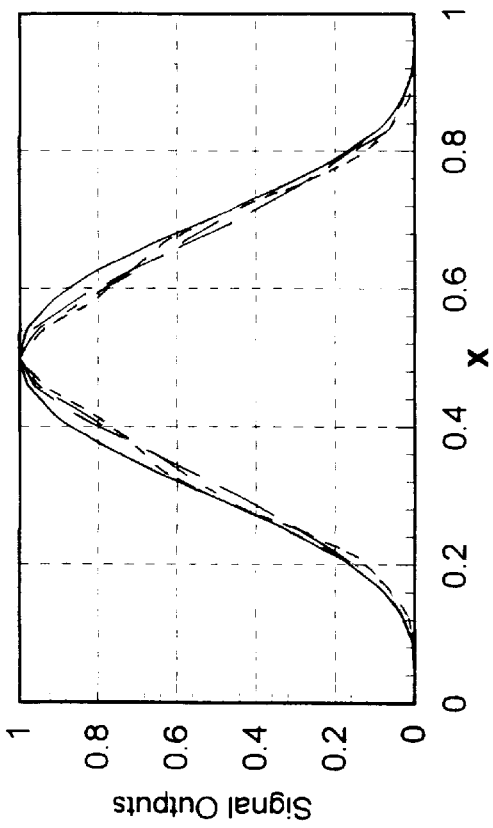
FIG. 9-B Pattern Group B
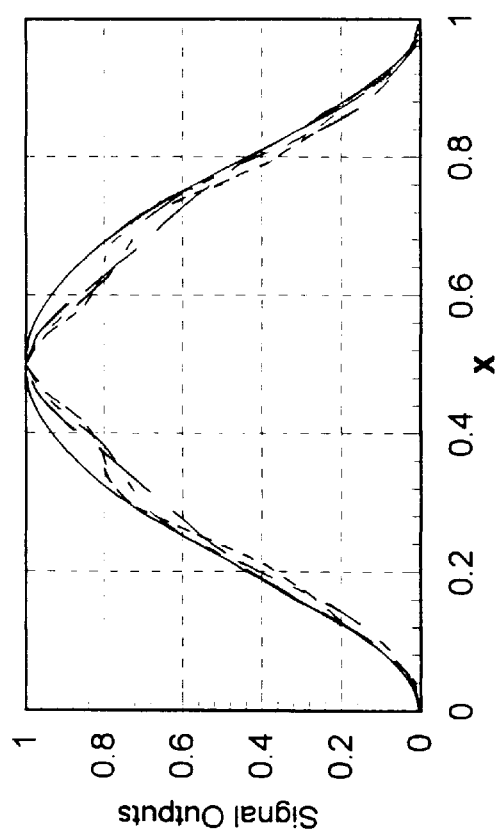
FIG. 9-C Pattern Group C

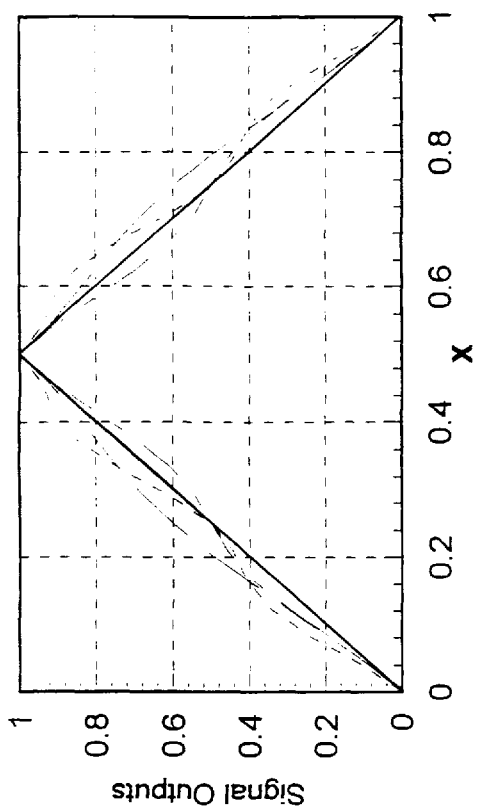
FIG. 9-E  Pattern Group E
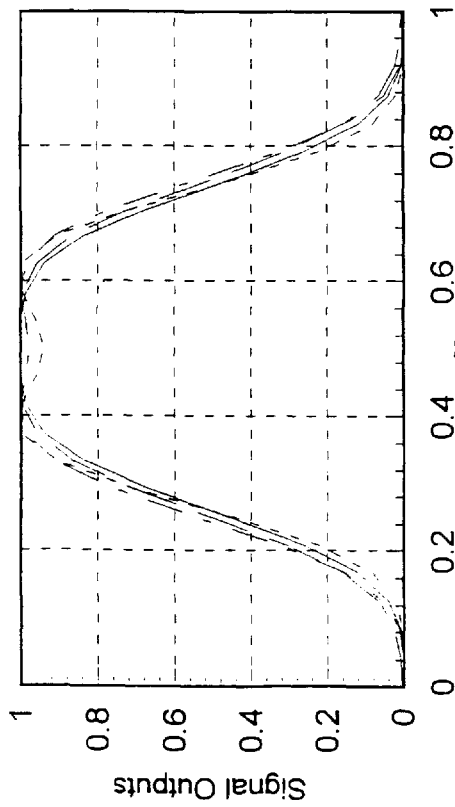
FIG. 9-D  Pattern Group D
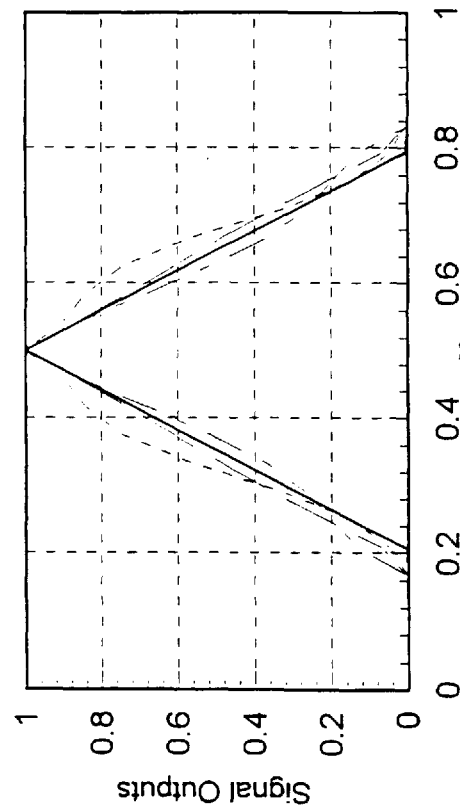
FIG. 9-F  Pattern Group F

SYSTEM FOR BUILDING AN ARTIFICIAL NEURAL NETWORK

DESCRIPTION

This application claims the benefit of priority from co-pending U.S. Provisional Application Ser. No. 60/031,065, filed Nov. 15, 1996.

FIELD OF THE INVENTION

The present invention relates to a system (and method) for building an artificial neural network, and particularly to a system for building an artificial neural network which provides a network structure of artificial neurons based on pre-arranged input data and non-iterative determination of the synaptic weights for the artificial neurons on the network. In contrast with conventional approaches to building artificial neural networks, discussed below, which rely on training an artificial neural network to reflect a mathematical structure of an input data set, the present invention provides an artificial neural network through designing rather than training.

BACKGROUND OF THE INVENTION

An artificial neural network is defined as a mathematical model representing the biological behavior of neurons which classify patterns inputted into the artificial neural network. In order for an artificial neuron to correctly classify input patterns, adjustable weights and threshold must be appropriately set for each neuron or unit of the artificial neural network. The adjusting process is commonly referred to as training or learning, which reflects the traditional iterative nature of the biological learning processes. It follows the perception correction rule, as described, for example, in Roseblatt, *Principles of Neurodynamics*, New York: Spartan Books (1959), which states that a trained artificial neural network reflects a mathematical structure of an input-data set recursively selected in an on-line fashion. This view has motivated researchers to develop iterative training schemes for artificial neural networks which are time-consuming and computationally intensive. Moreover, such schemes often improperly position the classification boundaries of the artificial neural network which can result in prematurely-trained artificial neurons. These classification boundaries refer to the individual settings of the weights and threshold of each of the artificial neurons to properly distinguish between input patterns.

The following describes the mathematical formulations and existing approaches for building artificial neural networks. An artificial neural network is comprised of multiple processing units, each of which is a simple mathematical model of a neuron, as shown in FIG. 1, acting as a classifier, and is often referred to as a perception or Adaline. A vector $x^i$ of N entries constitutes the data set 10 of K input vectors $x^i$ (i=1, 2, ..., K), each of which is represented by a point and labeled by a scaler valued class-indicator $d^i$. The input vectors $x^i$ (i=1, 2, ..., K) are fed through N input-nodes 20 to units 12. Each unit 12 consists of a hard limiter 13, a linear summer 14 and a linear combiner 15. The linear summer 14 performs weighted linear summation s with an N-dimensional weight vector w for the input vector $x^i$. The hardlimiter 13, f(u), activates a high-or-low output (usually bipolar or binary), denoted by a scaler variable y, and connected to an output node 22, after a threshold $w_0$ is added to the weighted sum s in the linear combiner 15, resulting in a scaler variable u.

To correctly classify patterns, the weights and the threshold form a boundary 16, and must be appropriately adjusted, so that it is properly positioned between clusters 17 of data points. A boundary margin 18, denoted by z, exists between the boundary and a data point in the data set, and is obtained for each point by $z^i = u^i d^i$, i=1, 2, ..., K. For correct classification, this boundary margin 18 should be positive. The boundary, whose directional vector is set by these weights, is properly positioned between pattern clusters in the data set by the specified threshold.

In FIG. 1, the data set 10 of K input vectors is expressed by a matrix X whose dimension is N×K, i.e., $X = [x^1, x^2 ..., x^K]$, and correspondingly a K-dimensional vector d is formed as the class indicator, i.e., $d = [d^1, d^2, ..., d^K]^T$ where the superscript T indicates the transpose. With the matrix X, outputs form the linear summer 14 for all the members in the data set are denoted by a K-dimensional vector s and expressed as $$s = X^T w. \quad (1)$$

A bias term of $w_0$ is added to the vector s, and the linear combiner' outputs for the data set, denoted by a K-dimensional vector u, can be represented by $$u = s + w_0 1 \quad (2)$$

where 1 is the K-dimensional column vector of ones, i.e., $1 = [1, 1, ..., 1]^T$. The unit's outputs can be expressed as y=f(u) where f( ) is the K-dimensional vector of the limiter function, f(u), i.e., $f = [f(u^1), f(u^2), ..., f(u^K)]^T$. When the class indicator d is bipolar, the boundary margins in the data set is denoted by a K-dimensional vector z, $(z = [d^1 u^1, d^2 u^2, ..., d^K u^K]^T)$, and can be mathematically computed by an equation, z=Du, where D denotes the diagonally arranged matrix of d.

Classifier's errors are defined as discrepancy between unit's outputs and the corresponding class-indicators. For correct classification, an output-error to each element at the data set 10 is required to be zero, i.e., $d^i - y^i = 0$, i=1, 2, ..., K, when the boundary is placed between the clusters (referred to hereinafter as the zero-error requirement). As the dual representation of this zero-error requirement, the boundary-margin is to be positive at each member of the data set, i.e., $z^i = u^i d^i > 0$, i=1, 2, ..., K, which is regarded as the positive boundary-margin requirement.

The training performance for the zero-error output requirement is traditionally measured by a scaler-valued convex function which is the mean squares of the errors $J_P$ over the data set, and is given by $$J_P = [d-y]^T [d-y]. \quad (3)$$

With conventional approaches for building artificial neural networks, realized neural networks have a feed-forward structure of three or more layers of the aforementioned artificial neurons. A feed-forward structure is defined as a neural network where the neurons are not connected within one layer, but are usually fully connected between layers where information flows in one way toward network's outputs without any feedback loops.

For correct classification in a feed-forward structured artificial neural network, each unit's weights and bias on the entire network must be appropriately determined through a training or learning process. The majority of the training schemes conventionally used are back-propagation methods, as described in Rumelhart, D. E., Hinton, G. E. & William, R. J. (1986), Learning internal representations by error propagation, in *Parallel Distributed Processing: Explorations in the Microstructure of Cognition*, vol. 1:

*Foundations*, D. E. Rumelhart, and J. L. McClelland, Eds. Cambridge, Mass.:M.I.T. Press. In back-propagation, the output errors, Equation 3, is directly used as an objective function, and a numerical optimization method is applied to minimize it, leading to iterative adjustment of the network's weights and thresholds, as explained in Rumelhart et al. However, because of non-nonlinearity in the unit's limiter f(u) present implicitly in the vector y, the limiter is softened, as indicated by the smooth function profile. This compromise induces massive iterations to search for the solution, since the gradient information of the limiter is effectively available only around a narrow band of the softened limiter. Thus, back-propagation methods for training a feed forward artificial neural network is computationally intensive and thus time-consuming.

Moreover, the quadratic form of the output-errors, Equation 3, to be minimized as a single-valued object function, is not able to fully embody the classification requirement of zero-error, since it aggregates the errors over the entire data set. This scaler representation of the errors possesses multiple local-solutions for its minimum due to the limit's nonlinearity, and the majority of the solutions partially satisfies the classification requirement. Therefore, often the obtained minimum solution for the weights and thresholds partially fulfill the training requirements, which results in ill-positioning of the boundaries, leading to prematurely-trained artificial networks.

The fundamental drawback of the back-propagation methods stems from network's structural assumption concerning the number of neurons and their connection pattern especially for the network's middle layer(s). The necessary number of the neurons is assumed, and all of them are fully connected between the layers. In back-propagation, the role of the middle layers, i.e., artificial neurons connected between layers, are so unknown that they are often referred to as the hidden layers.

In back-propagation, the training problems is defined as nonlinear parameter optimization on the assumed network structure. Thus, even if the global minimum solution is reached on the assumed structure, the trained neural networks do not necessarily lead to correct classification.

Another approach to building an artificial neural network is the optimal associative mapping/linear least square method. In this method, the limiter's nonlinearity, f, is omitted from the neuron model to generate linear outputs, and the error criterion, Equation 3, is altered as $$J_c = [d-u]^T [d-u]. \qquad (3)$$

Differentiation of this error criterion $J_c$ with respect to w and $w_0$ yields the necessary condition for the least square-errors between u and d, $$\left[ \begin{pmatrix} X \\ 1^T \end{pmatrix} (X^T 1) \right] \begin{pmatrix} w^* \\ w_0^* \end{pmatrix} = \begin{pmatrix} X \\ 1^T \end{pmatrix} d \qquad (5)$$

where $w^*$ and $w^*_0$ denote the optimized weights and threshold, respectively.

By solving the above linear equation an analytical expression for the optimized weights and threshold can be obtained. This approach is fundamental to statistical analysis, and, for example, is described in Campbell, S. L. & Meyer, C. D. (1979) *Generalized Inverses of Linear Transformations*, London: Pitman Publishing, and is interpreted in terms of pattern recognition which is known as the optimal associative mappings, as described in Kohonen, T., (1988) *Self-Organization and Associative Memory*. 2nd Ed., New York: SpringerVerlag.

However, the omission of the nonlinearity in the optimal associative mapping/linear least square approach impairs performance of the artificial network as a pattern-classifier. Although this leads to a computationally advantageous non-recursive algorithm, the linearized limiter's bias term could shift the classification boundary into an unintended pattern cluster, resulting in incorrect pattern classification.

Still other approaches to building artificial neural networks have involved either a centered data matrix, a potential function, or a ridge estimator. To build an artificial neural network by creating a centered data matrix, linear equation 5 is divided into two parts, as shown in Campbell, S. L. & Meyer, C. D., (1979) *Generalized Inverses of Liner Transformations*. London: Pitman Publishing: (a) the bias optimized with the error criterion for Equation 4 is given by $$w^*_0 = 1^T d/K - \bar{w}^*_0$$

where $\bar{w}^*_0 = \bar{x}^T w^*$ and $\bar{x}^T = (1/K) 1^T X^T$, and (b) the optimal weight vector must satisfy the following equation.

$$CX^T w^* = Cd.$$

The K×K matrix C is known as the centering matrix, which is described, for example, in Wetherill, G. (1986), *Regression Analysis with Applications*, Chapman and Hall: New York and defined as $$C = [I - (1/K) 1 (1^T)] \qquad (6)$$

where I denotes a K×K identity matrix. It shifts the coordinate origin of the data set to its data center where the unit's weights are to be optimized. When a K×NΞ denotes a centered input matrix, $\Xi = CX^T$, a relation between Ξ and X is determined by $$\Xi = X^T - 1 \bar{x}^T. \qquad (7)$$

The above relation indicates that the input data matrix is needed to be centered, when the weight vector is optimized separately from the bias term.

Another approach to building an artificial neural network involves creating a potential function. Exclusion of a constant term of $d^T d$ in the factored error criterion $J_C$, Equation 4, gives $$J_D = 2 d^T u - u^T u,$$

which is regarded as the correlation learning potential, one of the learning potential functions, for neurons in the neural network, as described, for example, in Amari, S. (1991), *Mathematics in Neural Networks*. Tokyo: San-Gyoh Tosho. This learning potential is used to represent the iterative nature of biological learning/training processes, in which the dynamics of the weights are formulated with a differential equation in a statistical sense. The weights are shown to statistically converge to the averaged equilibrium at which correlation between d and u is maximized and simultaneously the magnitude of u is minimized. The maximization of the correlation learning potential $J_C$ gives the identical weights optimized as the least square-errors between u and d.

A still further approach to building an artificial neural network uses a ridge estimator in combination with the above optimal associative mapping linear least square approach. The data matrix X often becomes singular or near singular as it dimensionally increases, which leads to computational difficulty. To accommodate it, a term of the weight's vector norm with a parameter k, that is—$kw^T w$, is added as an auxiliary term to the output square errors, Equation 4.

$$J_{ridge} = [d-u]^T [d-u] + kw^T w.$$

The linear equation derived by differentiating the above $J_{ridge}$ is known as the ridge estimator, as described in Bibby, J. & Toutenburg, H., (1977), *Prediction and Improved Estimation in Linear Models*, New York: John Wiley & Sons. Although the parameter k distorts optimized solutions, it's presence gives computational stability. The larger the value of k becomes, the more the extent of skewed solution and numerical stability increases.

SUMMARY OF THE INVENTION

It is the principal object of the present invention to provide an improved system for building an artificial neural network in which a network structure is created based on pre-arranged input data, and non-iteratively determined synaptic weights of artificial neurons of the network, thereby avoiding the computational intensive and time consuming iterative training of prior art artificial neural networks.

It is another object of the present invention to provide an improved system for building an artificial neural network which provides a network structure that can be a mixed layer structure in which one to three layers can be combined.

It is still another object of the present invention to provide an improved system for building an artificial neural network which eliminates premature and false training of artificial neurons, and reduces the number of synaptic connections between neurons and the number of artificial neurons over prior art artificial neural networks.

Briefly described, the present invention provides a system (and method) for building an artificial neural network of artificial neurons on a computer using input data representing patterns of different classes of signals in which a programmed computer analyzes the input data to generate one or more data points in two or three dimensions representative of the signals in each of the different classes, and provides for visualizing the distribution of the data points on a map in two or three dimensions using an output device coupled to the computer. The data points on the map are clustered on the map into clusters in accordance with the classes associated with the data points. The map is then partitioned into regions by defining linear boundaries between clusers. The artificial neural network is configured in accordance with the data points, clusters, boundaries, and regions, such that each boundary represents a different artificial neuron of the artificial neural network, and the geometric relationship of the regions on the map to the classes defines the logic connectivity of the artificial neurons. The synaptic weights and threshold of each artificial neuron in the network are graphically determined based on the data points of the map.

The configured artificial neural network can provide a network structure as a group of connected artificial neurons or as multiple segments (groups of connected neurons) of one to three layer structures.

BRIEF DESCRIPTION OF THE DRAWINGS

The foregoing objects features advantages of the present invention will become more apparent from a reading of the following description in connection with the accompanying drawings in which:

FIGS. 9-A1, 9-A2, 9-B, 9-C, 9-D, 9-E and 9-F are examples of signals for seven groups of input patterns;

DETAILED DESCRIPTION OF THE INVENTION

The terminology set forth above is used for the purpose of explaining the present invention. Equations A-1 to A-22 in the following description are located in Appendix A.

Figure 1:
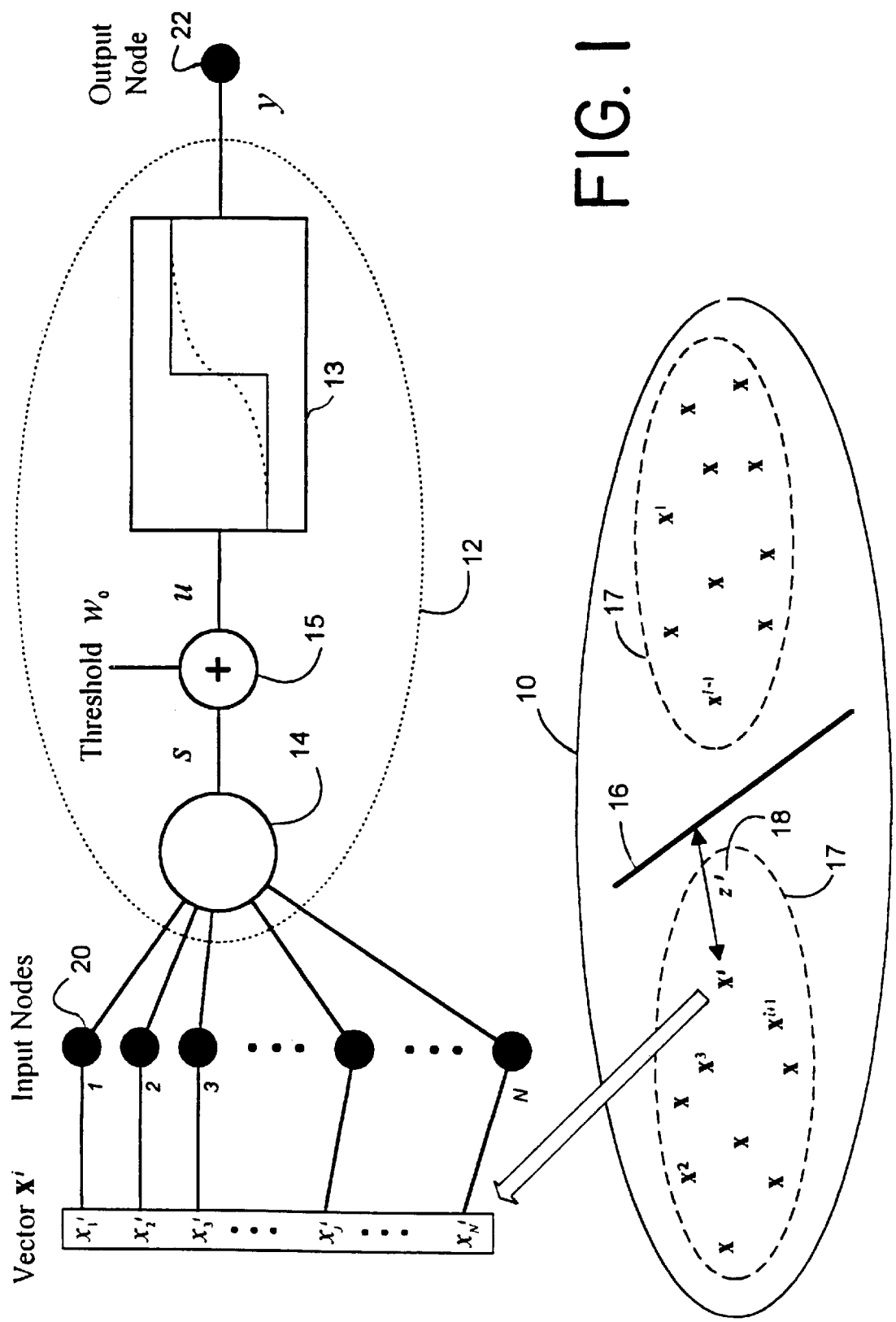
FIG. 1 is a block diagram model of a neuron for an artificial neural network.

The system of the present invention includes a computer and peripherals, such as a display, printer or plotter coupled to the computer. The computer is programmed with software stored in memory of the computer, and has software for driving the peripherals. The computer provides on the peripheral a graphical representation of a multi-dimensional map of an input data set for an artificial neural network. The data set is shown on the peripheral by the computer transforming each column vector $x^i$ ($1 \leq i \leq K$), as shown in FIG. 1, into a point on a two- or three-dimensional map. A class each of the column of vectors $x^i$ belongs is recognized visually by an operator (or automatically by the computer), and the distribution of the data points of the map is examined. Based on the data point distribution, the map is partitioned by linear boundaries between groupings of data points. In reference to the partitioned map(s), a structure of an artificial neural network is configured by the computer, and synaptic weights of artificial neurons are directly determined based upon the data points between visually partitioned boundaries. The operation of the system is described in more detail below.

In determining a structure of an artificial neural network, two or three dimensional (2D/3D) map(s) of the present invention is utilized rather than the full-dimensional data space. The partitioned 2D/3D map(s) is served as a sufficient condition for the purpose of properly partitioning the full-dimensional data space. In other words, artificial neural networks properly designed based on the 2D/3D map(s) perform as well as those based on the full-dimensional data space.

To create the 2D/3D map, a set of the weight vectors, $w^*_i$ ($1 \leq i \leq M$) into Equation 1 gives the output vector $s^*_i$ of the linear summer 14 (FIG. 1) as a multiplication of the data matrix X and the weight vector $w^*_i$, that is $$s^*_i = X^T w^*_i, \quad (8)$$

and the centered vector of which is also determined in terms of a multiplication of the centered data matrix $\Xi_R$ and the weight vector $w^*_i$, $$\sigma^*_i = \Xi_R w^*_i \quad (9)$$

When biases $w^*_{0i}$ corresponding to the defined weights are given, an output vector from the linear combiner 15 is obtained, based on Equation 2, by adding the output vector $s^*_i$ and a vectored bias $w^*_{0i}$, $$u^*_i = s^*_i + w^*_{0i} \mathbf{1}. \quad (10)$$

where the index i satisfies the range, $1 \leq i \leq M$.

In the 2D/3D map hereafter, a point which a column vector in the data-matrix is transformed into can be visualized. Thereby, a viewable image of the data-matrix X is created so that distribution of data points can be visually investigated and integrity of the data set is also examined as a sufficient condition for proper classification or clustering.

Use of the x-y or x-y-z Cartesian coordinates greatly exchanges usefulness of the map furnished by the present invention because of linearity the Cartesian coordinate system has, although the present invention does not preclude use of non-Cartesian coordinate system.

One advantage of using the Cartesian coordinate system for the map is that a new boundary can be graphically positioned, and represented by a linear combination of the weight vectors which are used for the map's Cartesian coordinates. This weight vector's linear combination provide a new weight and bias for an artificial neuron in designing a network structure of artificial neurons. Its mathematical derivation for the weights and bias is described later.

Figure 2:
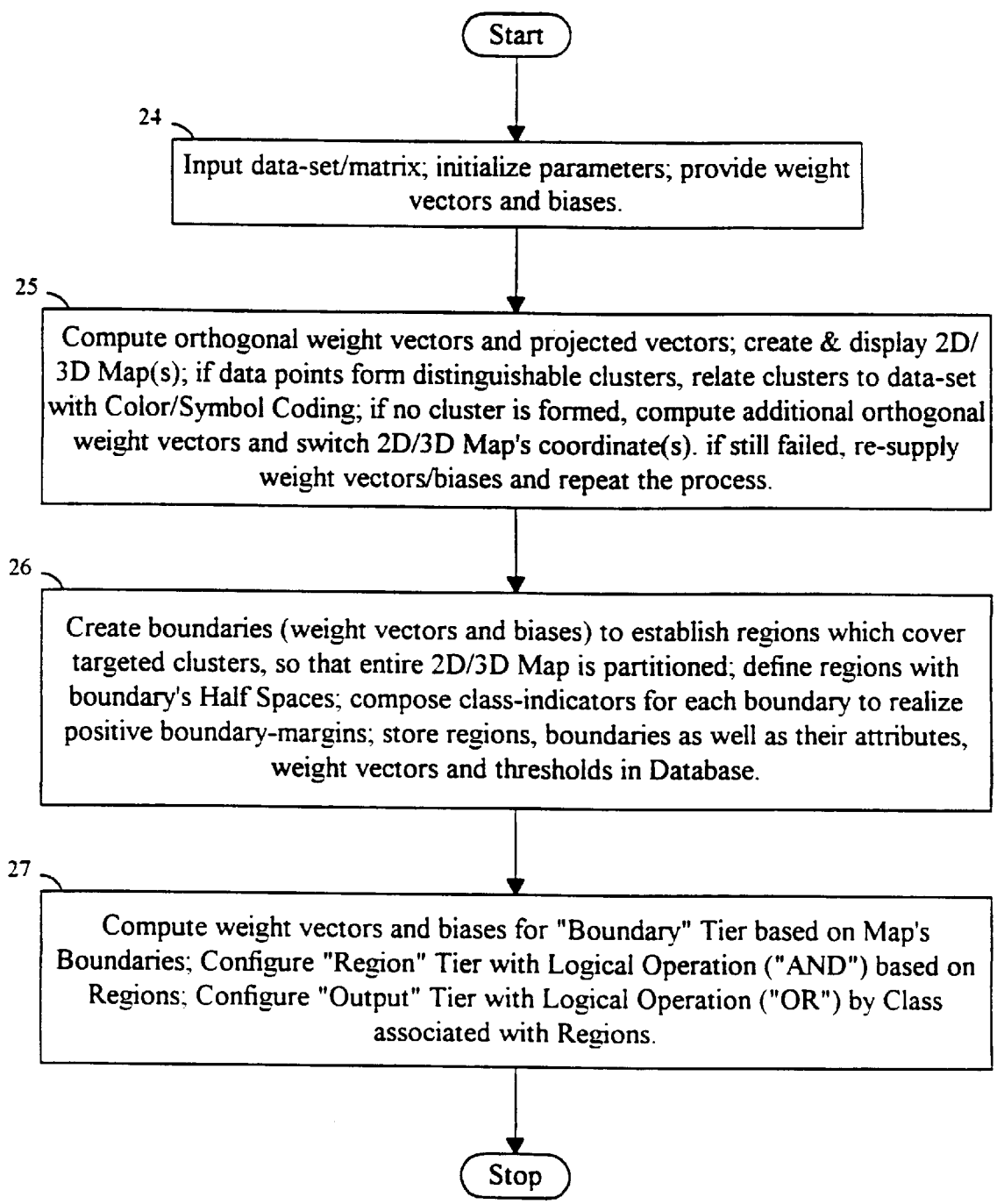
FIG. 2 is a flow chart showing the operations of building an artificial neural network in accordance with the system of the present invention.

Referring to FIG. 2, a flow chart of the major steps of the software (or computer program) operating on the computer is shown. First, at step 24, input data are provided which are selected and compiled in terms of an aforementioned data matrix X; and various parameters or variables, such as K, N, M, are also initialized. Each of the input data is evaluated to determine a class attribute which is stored as part of the input data. Those input data are stored in a matrix or vector form, in a part of a structured data, or as part of an object for each input data in the object oriented programming setting. Those objects should be accessible in the vector-matrix manner by linking them when various vector-matrix equations are called. The set of the weight vectors $w^*_1$ is provided either by numerically computing Eq. A-6 with their respective class attributes or by user's predetermined definitions. Respective biases $w^*_{01}$ are also initialized either with Eq. A-7 based on each weight vector $w^*_1$ or user's preset definitions.

Next, a two or three dimensional (2D/3D) map is created at step 25. The creation of a two-dimensional visualization of the input data set on the map is described as follows. One of the vectors of $s^*_1$, $\sigma^*_1$ and $u^*_1$ is selected for the x-coordinate and is calculated correspondingly with either Eq. 8, Eq. 9 or Eq. 10 based on the weight vector $w^*_1$ which can be given either by numerically computing Eq. A-6 or by using discretionary predetermined definitions.

To calculate projected vectors for the y-coordinate, the additional weight vector $w^*_2$ can be optimized by Eq. A-6 or specified by users; and either one of the vectors $s^*_2$, $\sigma^*_2$ and $u^*_2$ created by Eq. 8, 9, or 10 is chosen for the y-coordinate. If Eq. A-6 is used to optimize $w^*_2$ as well as $w^*_1$, as a class-indicator vector in Eq. A-6 should be differed from the one to optimize $w^*_1$.

These calculated vectors are plotted along each assigned coordinate to create a two-dimensional map. In order to adjust distribution of data points along each coordinate, real valued scaling factors, $C_x$ and $C_y$ respectively for the x- and y-coordinates, can be applied as coefficients for those projected vectors.

For three-dimensional visualization of the input data set on a map is also given below. The z-coordinate is attached to the aforementioned two-dimensional map and its projected vector is calculated, based on a weight vector $w^*_3$, additional to the x-y coordinates' $w^*_1$ and $w^*_2$. The additional weights $w^*_3$ can be optimized by Equation A-6 or specified by users. Either one of the vectors $s^*_3$, $\sigma^*_3$ and $u^*_3$ is calculated by Equation 8, 9, or 10, and is chosen to the z-coordinate. In order to adjust distribution of data points along the z-coordinate, a real valued scaling factor, $C_z$, can be applied to those above vectors as a coefficient.

As the 2D/3D map is created at step 25, a unique map-name is given to relate to said coordinate definition, constituting weight vectors, scaling factors, and other information necessary to define the map. A unique point-name is assigned to each of data-points which the data matrix $X=[x^1, x^2, \ldots, x^K]$ becomes, in order to relate the numerical definition of a displayed or plotted data-point to the corresponding column vector $x^i$ ($1 \leq i \leq K$). Furthermore, a unique class-name is designated respectively to the aforementioned high- and low-valued indicators for each of the class indicator vectors $d_l$ ($1 \leq l \leq L$), (i.e. 2×L class-names in total), and is related to each of said data-points.

The above names comprises characters (inclusive of numerical numbers and letters hereafter or combination of symbols and the characters, which are uniquely composed to maintain their distinctive accessibility. The names are tied each other, so that when a data-point in the map in interactively specified, for instance, with a pointing device on the monitor's screen or with any other methods, its belonging class and column vector $x^i$ are available through the corresponding point-name.

A display code, assigned to each of said data-points, comprises definitions of shape, size and color for said data-point as well as said class. It is used to distinguishably show not only each location of said data-points in the 2D/3D map, but also said class each data-point belongs to. The display code may include characters (inclusive of numerical numbers and letters hereafter) or symbols, or combination or symbols and said characters along with the their style and color specification, which may be shown on or near a data-point's plotted/displayed location.

When the above calculated vectors are plotted on the computer peripherals (such as printers, monitors, or plotters) the above coding information can be interactively specified, and the aforementioned shape, size and color are added according to the display code information. These display codes are tied to the associated name, and the names and corresponding display codes are stored as a separate vector, as a part of a structured data, or as a part of an object in object-oriented programming.

When each column vector $x^i$ ($1 \leq i \leq K$) is transformed into a visible point in the two- or three-dimensional map, a class each of said column vectors $x^i$ belongs to can be recognized visually. The distribution of the data points can be examined based on the 2D/3D map where the aforementioned display-codes are implemented. If distribution pattern of data points is not satisfactory, a new 2D/3D map may be created based on a new weight vector for re-examination. For example, the distribution pattern may not be satisfactory where data points cannot be separately clustered in the map.

To label clusters found in the 2D/3D map of the data matrix, a cluster-name is uniquely assigned to respective data-points in each of the clusters, and also related to the map-name. A display code is also assigned to the cluster member data-points, and cluster of the data-points can be visually identified by data-point's shape, size and/or color, in order to separate from the other clusters in the 2D/3D map. The display code may include the characters and/or symbols as defined and displayed for the map-name, point-name, and class-name.

After the map is created, then at step 26 of FIG. 2, the entire 2D/3D map is partitioned. Specifically, the 2D/3D map where data-points are clustered is partitioned into regions by creating linear boundaries so that each region essentially contains targeted clusters of data points. The boundaries are graphically positioned in the 2D/3D map so as to increase the magnitude of positive margins on targeted clusters and/or to eliminate non-targeted clusters with negative margins.

Each region is established by superposing half-spaces which the respective boundaries divide the map. It can be mathematically expressed as a set of half-space equation such as a $\alpha x+\beta y+\gamma z+\delta>0$ or $\alpha x+\beta y+\gamma z+\delta<0$ for the 3D map; and $\alpha x+\beta y+\delta>0$ or $\alpha x+\beta y+\delta<0$, or $y>ax+b$ or $y<ax+b$ for the 2D map. By superposing the respective half spaces, a structure of an artificial neural network is designed, in terms of the partitioned 2D/3D map, to establish said regions.

Unique-names are assigned to the boundaries, the half-spaces and the regions defined in the map of the present invention, in order to label each of them and associate with the corresponding numerical definition. Each name for the half-spaces is tied to the corresponding boundary-name; and each of said region-names is tied not only to the boundaries surrounding the region, but also to the superposed half-spaces through their names; and those names are also tied to the map-name of the map. Each of the names is uniquely defined and stored in the same way as the point-name and class-name are comprised and stored.

A display code, assigned to each of boundary-lines in the map, comprises definitions of a line-style, width and color, so as to be visually distinguished from the other boundaries in the map. A display code, assigned to each of the boundary-planes, the half-spaces and the regions in the map, comprises definitions of a fill-style and pattern-style and color, so as to be visually distinguished from the other boundaries, half-spaces or regions in the map. Thereby, each of the half-spaces or each of the regions is uniquely colored and/or shaded with a distinguishable fill-style or pattern-style, so as to be visually distinguishable from the other half spaces or the other regions in the 2D/3D map. The aforementioned names and display-codes can be interactively specified, and stored in the same way as the point-name and class-name are stored together with their display-codes.

For correct classification, the data space S, or pattern space, formed by the data matrix $X=[x^1, x^2 \ldots, x^K]$, is to be partitioned into multiple regions, so that all the points $x^i$ ($i=1, 2, \ldots, K$) in the respective partitioned regions retain positive boundary margins. Some of the regions in the data space S may require more than one boundary. Such a region can be defined by superposing half-spaces, each of which is established by associated boundaries and commonly shares the region containing targeted clusters of data points in the data space S.

For a multidimensional data matrix (for instance, more than 4 patterns), however, it is impossible to determine whether a half space covers a particular region containing targeted clusters, since there it no method that represents any geometric relationship between a boundary and data points effectively in the data space S. When the data matrix X is transformed into its Cartesian 2D/3D map such as described earlier, it becomes possible to visually position a boundary so as for its divided half-space of the map to contain targeted clusters of data points.

Due to the linearity of the aforementioned transformation as indicated earlier, geometric relationship among clusters of the data points remains undistorted between the Cartesian 2D/3D map and the data space S. The clustered map can be regarded as a sufficient condition for the case of the full-dimensioned data-space S (or pattern space) spanned by data vectors, $x^1, x^2, \ldots, x^K$. Each cluster's geometric relationship to its belonging region's boundaries is also unchanged between the Cartesian 2D/3D map and the data space.

Therefore, a boundary and its divided half space of the data space S can be visually evaluated and interpreted by examining the data space's corresponding Cartesian 2D/3D map as to whether or not the half space contains the targeted region and its contained clusters. Moreover, when a region and its defining boundaries are established in the Cartesian 2D/3D map in order to exclusively contain targeted clusters in the data space S. A region which is established by superposing half-spaces in the Cartesian 2D/3D map based can be realized by superposing the corresponding half-spaces in the data space S. This can be also extended to a higher dimensional map.

At step 27 of FIG. 2, the weight vectors and biases associated with each linear boundary are determined. Given the weight vector $w^*_i$ as well as a bias value $w^*_{0i}$, the scaler variables of $s^*_i$, $\sigma^*_i$ and $u^*_i$ can be defined, corresponding to the aforementioned vectors of $s^*_i$, $\sigma^*_i$ and $u^*_i$, as $$\left.\begin{aligned} s_i^* &= x^T w_i^* \\ u_i^* &= s_i^* + w_{0i}^* \\ \sigma_i^* &= s_i^* - \overline{w}_{0i}^* \end{aligned}\right\} \quad (11)$$

where x denotes an arbitrary N-dimensional input vector and $\overline{w}^*_{0i}$ is given by $\overline{w}^*_{0i}=\overline{x}^T w^*_i$.

Similarly, regarding an N-dimensional vector $n^*_\zeta$ orthogonal to $w^*_i$ the scaler variables of $\mu^*_\zeta$, $m^*_\zeta$ and $v^*_\zeta$ are also defined as $$\left.\begin{aligned} m_\zeta^* &= x^T n_\zeta^* \\ v_\zeta^* &= m_\zeta^* + n_{0\zeta}^* \\ \mu_\zeta^* &= m_\zeta^* - \overline{n}_{0\zeta}^* \end{aligned}\right\} \quad (12)$$

where $n^*_{0\zeta}$ is a given bias for the orthogonal weight vector, and $\overline{n}^*_{0\zeta}$ is given by $\overline{n}^*_{0\zeta}=\overline{x}^T n^*_\zeta$.

A difference in the coordinate readings of two points in the 2D/3D map based on the present invention provides a distance between two corresponding data-vectors when an artificial neuron is equipped with the weight vector $w_i$. Those readings provide an acceptable range for the artificial neuron's threshold.

Let $s_{i_{min}}^{*+}$ and $s_{i_{max}}^{*-}$, for instance, be the minimum coordinate reading among a class's cluster with a high valued indicator and the maximum coordinate reading among a class with a lower valued indicator, respectively, and they can maintain $s_{i_{max}}^{*-}<s_{i_{min}}^{*+}$ for linearly separable clusters if the weights $w_i$ is properly determined. As the positiveness requirement on boundary margins is applied, simple mathematical manipulation yields $s_{i_{max}}^{*-}<w_{0i}<s_{i_{min}}^{*+}$. The relation furnishes specification on a threshold for $w_{0i}$ for the artificial neuron to ensure positive boundary margins for linearly separable classification. If the clusters overlap, then a difference $s_{i_{max}}^{*-}-s_{i_{min}}^{*+}$ is positive, indicating a overlapping distance of the clusters.

A new linear-boundary created in the aforementioned three-dimensional map can be represented in terms of the weight vectors which are used for the x-y-z coordinates. A three-dimensional linear-boundary can be expressed as a plane equation such as $\alpha x+\beta y+\gamma z+\delta=0$, where $\alpha$, $\beta$, $\gamma$ and $\delta$ are a real valued coefficient. (In three-dimensional space, the linear-boundary referred to herein is a plane-boundary.) Half-spaces of the map, which are defined by the linear-boundary, are mathematically expressed as $\alpha x+\beta y+\gamma z+\delta>0$ and $\alpha x+\beta y+\gamma z+\delta<0$.

The plain equation is utilized to derive equations for a new linear-boundary and the corresponding new weight vector. Its derivation is presented below according to the aforementioned coordinate variable arrangement.

When the variables, $u^*_1$, $u^*_2$ and $u^*_3$, are assumed to be assigned to the x-, y- and z-coordinates with the scaling factors $C_x$, $C_y$ and $C_z$, respectively, the above plain equation becomes a $\alpha C_x u^*_1+\beta C_y u^*_2+\gamma C_z v^*_3+\delta=0$. The variables, $u^*_1$, $u^*_2$ and $u^*_3$, as rewritten according to Eqs. 11 and 12, and substituting them into the above relation yields $$(\alpha C_x w_1^{*T}+\beta C_y w_2^{*T}+\gamma C_z w_3^{*T})x+\alpha C_x w^*_{01}+\beta C_y w^*_{02}+\gamma C_z w^*_{03}+\delta=0$$

When an artificial neuron is equipped with a new weight vector $w^{new}$ and a new bias $w_0^{new}$, an output, u, from an artificial neuron's linear combiner is expressed as $W^{new\,T}x+w_0^{new}=u$ for an arbitrary N-dimensional input vector x. At the boundary (u=0) it becomes $w^{new\,T}x+w_0^{new}=0$ and comparing this relation with the above equation gives the following expressions for a new weight vector and bias.

$$w^{new}=\alpha C_x w_1^{*T}+\beta C_y w_2^{*T}+\gamma C_z w_3^{*T} \quad (13)$$

$$w_0^{new}=\alpha C_x w^*_{01}+\beta C_y n^*_{01}+\gamma C_z n^*_{02}+\delta \quad (14)$$

For the case where the variables containing no bias such as $s^*_1$, $\sigma^*_1$, $m^*_1$, $m^*_2$, $\mu^*_1$ or $\mu^*_2$ are used, the new bias becomes $\delta$ and the above weight vector remains valid.

When an artificial neuron is equipped with $w^{new}$ and $w_0^{new}$, its linear combiner generates the high output for data-points in the half-space, defined by $\alpha x+\beta y+\gamma z+\delta>0$, and the low output for those in the half-space defined by $\alpha x+\beta y+\gamma z+\delta<0$. This is easily seen by similar substitution for the half-space equations in lieu of the boundary equation.

In the aforementioned two-dimensional map a new linear-boundary is represented by a line equation, $\alpha x+\beta y+\delta=0$ where the term relative to the z-coordinate is omitted. The results obtained for the three-dimensional case can be adapted by eliminating the z-coordinate term, and summarized below according to the coordinate variable arrangement.

When the variables, $u^*_1$ and $u^*_2$, are assumed to be assigned to the x- and y-coordinates with the scaling factors $C_x$ and $C_y$, respectively, the line equation becomes $\alpha C_x u^*_1+\beta C_y u^*_2+\delta=0$, thereby leading to $(\alpha C_x w_1^{*T}+\beta C_y w_2^{*T})x+\alpha C_x w^*_{01}+\beta C_y w^*_{02}+\delta=0$. Therefore, a new weight vector $w^{new}$ and a new bias $w_0^{new}$ are obtained as:

$$w^{new}=\alpha C_x w_1^{*T}+\beta C_y w_2^{*T} \quad (15)$$

$$w_0^{new}=\alpha C_x w^*_{01}+\beta C_y w^*_{02}+\delta \quad (16)$$

Similarly to the three-dimensional case, the linear combiner of an artificial neuron, equipped with $w^{new}$ and $w_0^{new}$, generates the high output for data-points in the half-space, defined by $\alpha x+\beta y+\delta>0$, and the low output for those in the half-space defined by by $\alpha x+\beta y+\delta<0$.

When a line equation for the two-dimensional case is usually expressed as y=ax+b, (a and b denote a slope and a height at the y-coordinate, respectively), similar algebraic arrangement can be applied, resulting in $(aC_x w_1^{*T}-C_y w_2^{*T})x+aC_x w^*_{01}+b-C_y w^*_{02}=0$ for the variables $u^*_1$ and $v^*_1$ assigned to the x- and y-coordinates with the scaling factors $C_x$ and $C_y$, respectively. A weight vector and $w_{new}$ and a new bias $w_0^{new}$ then become $w^{new}=a\alpha C_x w_1^{*T}-C_y w_2^{*T}$; and $w_0^{new}=aC_x w^*_{01}+b-C_y w^*_{02}$. The linear combiner of an artificial neuron, equipped with $w^{new}$ and $w_0^{new}$, generates the high output for data-points in the half-space, y<ax+b, and the low outputs, i.e., $0>w^{new\,T}x+w_0^{new}=u$, for the half-space, y>ax+b. As for the obtained results for the above three- and two-dimensional cases, when the coordinate-variables can be switched among the coordinates along with the corresponding scaling, factors, the weight vectors as well as the biases are accordingly switched in the above new weight vector and new bias expressions.

Note that in the creation of the 2D/3D map, any vector is a possible candidate for the weight vector $w^*_i$ ($1 \leq i \leq 2$ or 3) as long as it is dimensionally compatible and linearly independent. However, it is believed that when an orthogonal weight vector is utilized to compute projected vectors for the plotting, distribution patterns of data points in the created map are in general improved and data point's spatial relationships become more recognizable. Furthermore, since a new weight vector as well as a new bias are obtained in terms of a linear combination of the weight vectors, added orthogonality effectively increase a reachable vector space of weights.

In the two-dimensional case the weight vector $w^*_2$, for example, can be optimally orthogonalized to the weight vector $w^*_1$ based on Eq. A-14, that is $n^*_1$ according to Eq. A-17 as presented in Appendix A. Based on this optimal orthogonal weight vector, denoted by $n^*_1$ one of the vectors $m^*_1$, $\mu^*_1$ and $v^*_1$ is calculated correspondingly with either Eq. A-20, A-21, or A-22 in lieu of the vectors $s^*_2$, $\sigma^*_2$ and $u^*_2$, and similarly plotted for the y-coordinate.

As for the three dimensional case, when the weight vector $w^*_1$ is given, there are two combinations of weight vectors: (1) a weight vector $n^*_1$ orthogonal to the given weight vector $w^*_1$ and an additional weight vector $w^*_2$; (2) weight vectors $n^*_1$ and $n^*_2$ which are mutually orthogonal each other and also orthogonal to the given weight vector $W^*_1$.

For the first case, the orthogonal optimal weights $n^*_1$ is obtained according to Eq. A-19 to achieve orthogonality respectively to $w^*_1$ and $w^*_2$. Either one of the vectors $m^*_1$, $\mu^*_1$ and $v^*_1$ based on Eqs. A-20, A-21, and A-22, is used and plotted for the z-coordinate, for example, while arranging the variables for the x-y coordinates is described for the aforementioned $w^*_1$ and $w^*_2$ combination of the two-dimensional case.

For the second case, the additional orthogonal optimal weights $n^*_2$ is obtained with Eq. A-18 for mutual orthogonality to both $w^*_1$ and $n^*_1$. Either one of the vectors $m^*_2$, $\mu^*_2$, and $v^*_2$ based on Eqs. A-20, A-21, and A-22, is used and plotted for the z-coordinate, for instance, while arranging the variables for the x-y coordinates is described for the aforementioned $w^*_1$ and $n^*_1$ combination of the two-dimensional case.

The computational procedures to compute the optimal orthogonal weight vectors are explained in Appendix B. The equations for a new weight vector $w^{new}$ and a new bias $w_0^{new}$ are still valid by correspondingly replacing the weight vector $w^*_1$ with the optimal orthogonal weight vector $n^*_1$, and further optimally replacing $w^*_2$ with $n^*_2$.

At step 27 of FIG. 2, a structure of a network of multiple artificial neurons is created based on regions defined in the 2D/3D map. The network is configured as a compound of multiple segments, each of which consists of one- to multiple-layers. At each segment the precise number of required artificial neurons and layers are identified. Although the term layer is used to indicate a set of multiple neurons in the prior art of artificial neural networks, the term tier is used to specify a layer within a network's segment which does not necessarily form a laminating layer spreading over an entire network.

When a targeted class has multiple regions in the 3D/2D map, those regions are assembled by an artificial neuron at an output tier, which is then connected to an output node for the targeted class. If one of the regions requires multiple boundaries, an artificial neuron at a region tier superposes corresponding half-spaces to define the region in the 3D/2D map, and its output is fed to the inputs of the corresponding output tier's artificial neuron. Boundaries (and their half-spaces) are defined by a boundary tier of multiple artificial neurons, whose outputs and inputs are connected to the corresponding region tier's inputs and the input nodes, respectively. The numbers of required artificial neurons at the boundary and region tiers exactly correspond to the respective numbers of the boundaries and regions in the 2D/3D map.

If one of the regions requires only a single boundary, for example, the corresponding second part of the region tier is skipped and directly connected to the artificial neuron for an output. When a targeted class has only one region containing clusters of data points for a targeted class, a region tier's neuron unit can be directly connected to a corresponding output node.

A network structure realized by this structure provides the least number of artificial neurons with no unnecessary connection between them. In contrast with prior art methods for building artificial networks in which a three-layer structure is typically prepared for artificial neural networks with the assumption of full connection between the layers. The system of the present invention provides an efficient design for artificial network structures without this assumption.

A boundary defined in the map is established by one single unit of an artificial neuron at the boundary tier which is directly connected to the input nodes.

When the boundary is graphically positioned in the Cartesian 2D/3D map, the weight vector and bias of an artificial neuron unit at the boundary tier can be obtained by the equations for said new vector $w^{new}$ and said new bias $w_0^{new}$.

The weight vector and bias obtained by aforementioned optimization, Eqs. A-6 and 7, can be also used for the boundary tier, as they are, if boundary-margins on the majority of targeted clusters of the data points remain positive.

When a boundary is determined for the boundary tier, the class attributes of data points with negative boundary margins are needed to be converted so that all of the data points have positive boundary margins.

An output's type, (high or low), of an artificial neuron in which the weight vector and the bias are incorporated is identified for all the data-points on a half-space of the created boundary, and saved as inputs to the region tier in the vector form. For all the data-points in a targeted region an output's type, (high or low), of an artificial neuron is selected and saved in the vector form as desired outputs for an artificial neuron at the region tier.

When a region requires multiple boundaries to be defined in the 2D/3D map, they are generated by multiple units of artificial neuron at the boundary tier. The outputs of those multiple artificial neurons are connected to an artificial neuron unit at the region tier which conceptually superimposes the respective half-space commonly sharing the targeted region.

The weight vector of that artificial neuron unit at the region tier can be computed by applying Eq. A-6 based on aforementioned converted attributes. Its bias can be optimized by Eq. A-7, or tuned so that positive boundary margins are retained in the 2D/3D map.

For the case where only one boundary is necessary to cover a region containing targeted clusters of data points, one artificial neuron unit at boundary tier can create a necessary boundary and its half-space containing the targeted region, and can function as a region tier's neuron.

Figure 4:
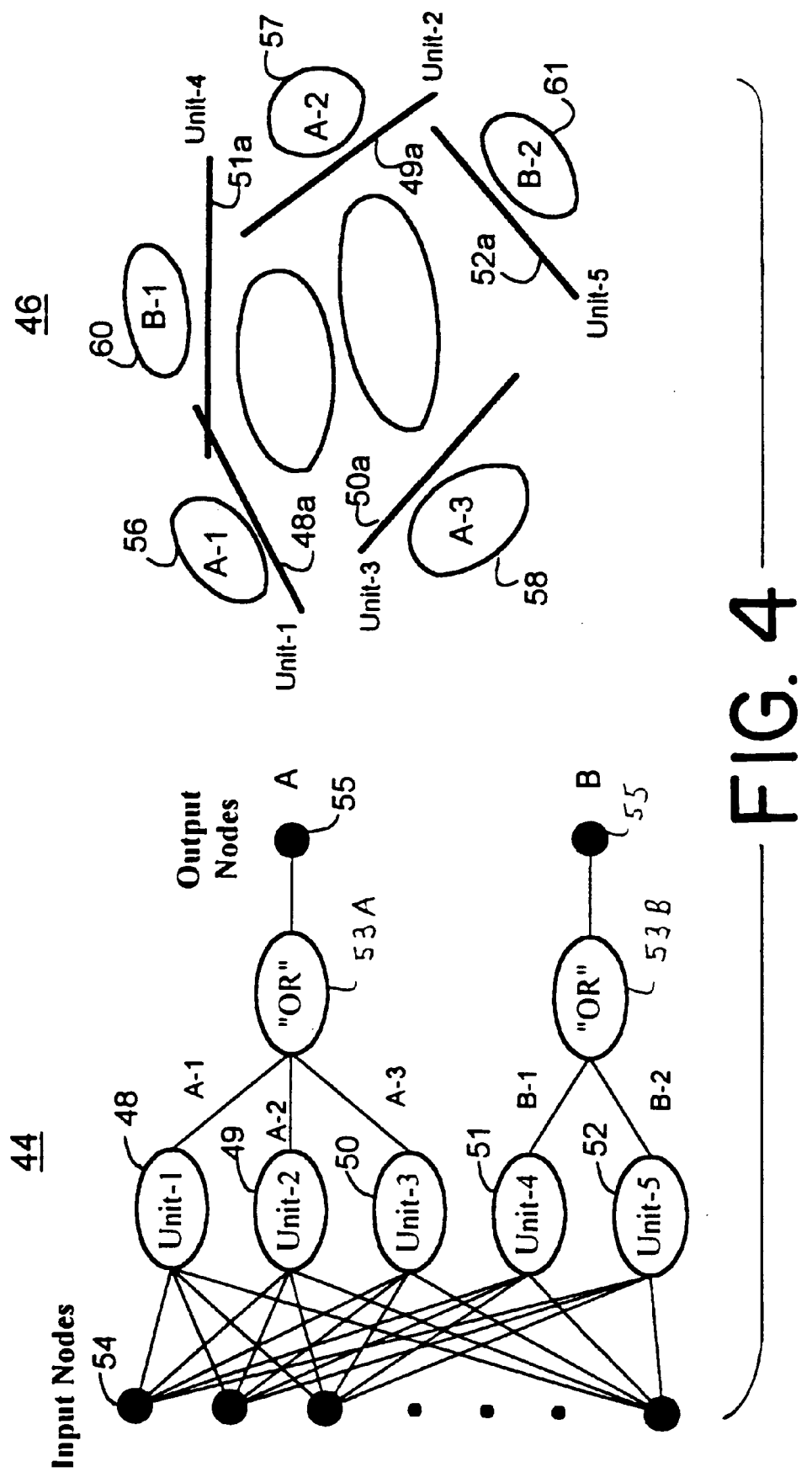
FIG. 4 is a map for part of an artificial neural network in another example of defining regions for multiple classes and its corresponding network structure.
Figure 5:
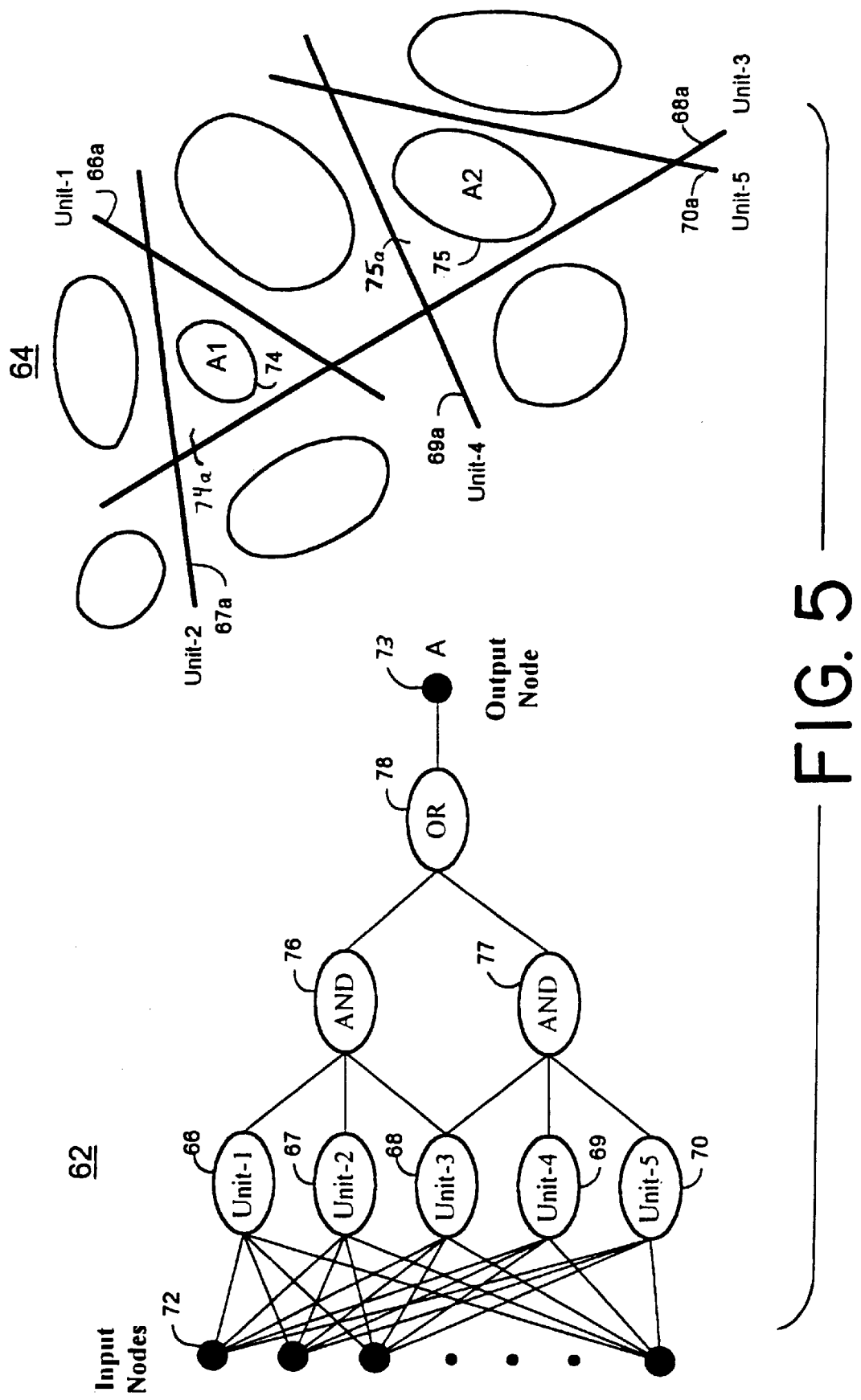
FIG. 5 is a map for part of an artificial neural network in an example of defining regions for a single class and its corresponding network structure.

Furthermore, as explained below, the weight vector and bias of an artificial neuron at the region tier can be determined so that a simple logic such as "AND" or "NAND" is performed. The configuring of an artificial network structure is illustrated in the examples of FIGS. 3–5.

Figure 3:
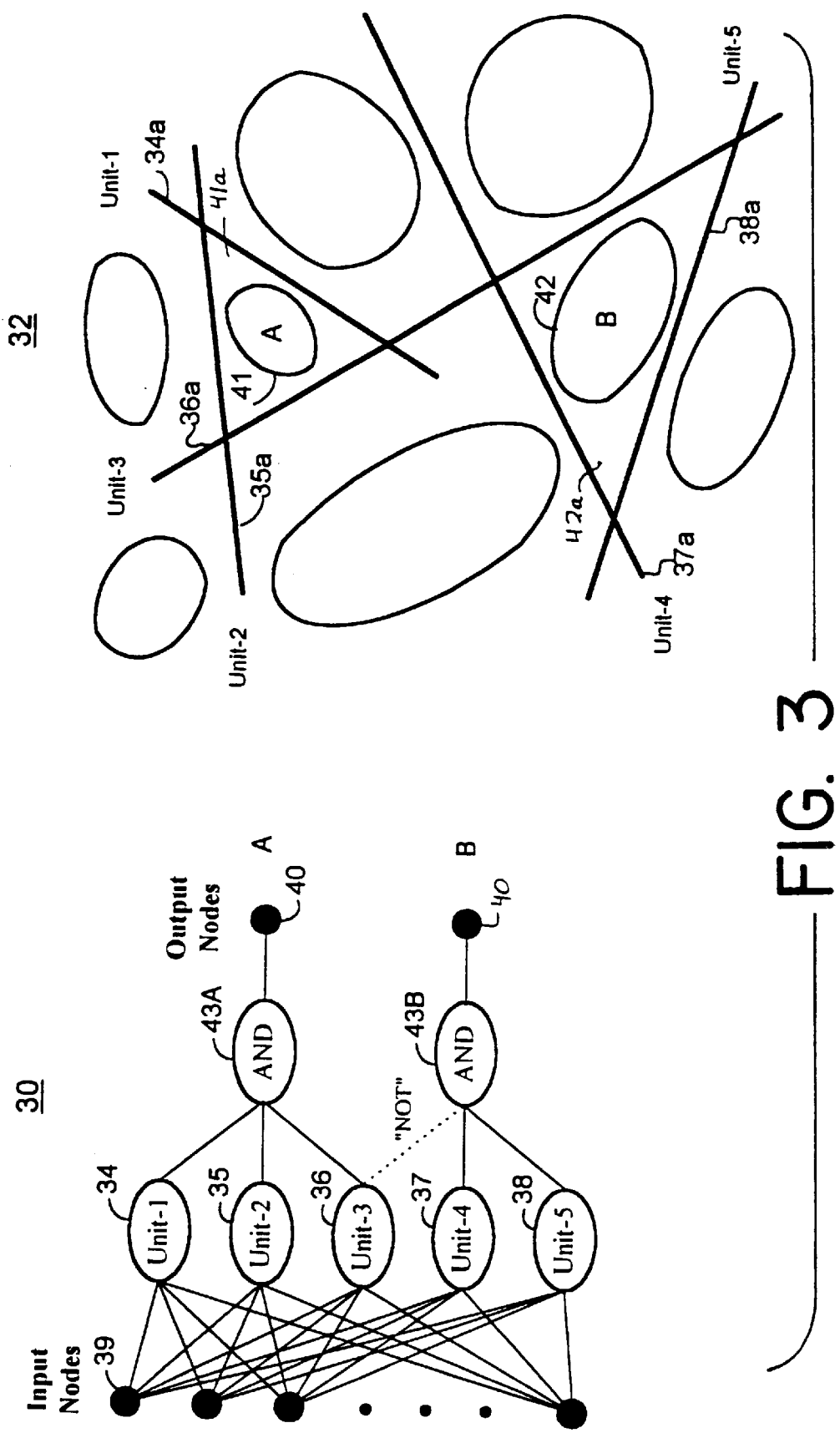
FIG. 3 is a map for part of an artificial neural network in an example of defining regions for multiple classes and its corresponding network structure.

Referring FIG. 3, map 32 is shown with an example for the case of the multiple classes (A and B) with a single cluster 41 and 42 for each in region 41*a* and 42*a*, respectively, and the corresponding network structure 30. The units 34, 35, 36, 37, and 38 (labeled unit-1 through unit-5) at the first layer are directly connected to input nodes 39, and each unit corresponds to a boundary 34*a*, 35*a*, 36*a*, 37*a*, and 38*a*, respectively, in map 32. All the unit's outputs are combined through logical AND units 43A and 43B, further directly connected to output nodes 40, for the corresponding class. At the AND unit 43B for the class B, the unit-3's outputs are reversed with the logical NOT operation, as indicated by a dot line in network 30. The logical NOT operation is accomplished by taking the negative of the unit-3's original output, and is necessary because the class B's cluster 42 is at the opposite side of the boundary dividing from class A's cluster 41.

The respective artificial neurons at the region tier are connected to an output artificial neuron at said output tier which is directly connected to an output node corresponding to the targeted class. Those units perform the logical "OR" on the outputs form the region tier's neuron units, unifying defining regions in the 2D/3D map. When a targeted class has only one region containing clusters of data points for a targeted class, a region tier's neuron unit can be directly connected to a corresponding output node.

A weight vector of an artificial neuron at the output tier can be computed by applying Eq. A-6 on the aforementioned desired outputs for the region tier as inputs and a targeted-class as desired outputs. The unit's bias can be optimized by Eq. A-7, or tuned so that the majority of the data-points retains positive boundary margins.

Referring to FIG. 4, a 2D map 46 is shown in an example of a two-class case consisting of multiple clusters 56, 57 and 58 (labeled A1, A2 and A3 in FIG. 4), clusters 60 and 61 (labeled B1 and B2 in FIG. 4), each of which is contained by a single region created by a single boundary 48*a*, 49*a*, 50*a*, 51*a* and 52*a*, respectively, and each such region is the boundary's half-space in itself. Boundaries 48*a*–52*a* correspond to artificial neurons 48, 49, 50, 51 and 52, respectively (labeled unit-1 through unit-5 in FIG. 4), and the first tier's artificial neurons in each class 48–50 and 51–52 are connected to the output artificial neurons 53A and 53B, respectively, to unify their outputs by the logical OR operation, and further directly connected to associated output nodes 55.

Referring to FIG. 5, a 2D map 64 is shown in an example of a single-class case consisting of two clusters 74 and 75

(labeled A1 and A2 in FIG. 5). Artificial neurons 66, 67, 68, 69 and 70 (labeled unit-1 through unit-5 in FIG. 5) at the boundary tier of network 62, directly connected to input nodes 72, correspond to boundaries 66a, 67a, 68a, 69a, and 70a, respectively, in map 64. All the unit's outputs are combined through a logical AND unit at the region tier for the corresponding regions, i.e., unit-1 to unit-3 are associated with the region 74a containing cluster A1 and combined through AND unit 76, and unit-3 to unit-5 are associated with the region 75a containing cluster A2 and combined through AND unit 77 in map 64. Then, the region tier's artificial neurons are connected to an artificial neuron 78 at the output tier to unify their outputs for the class by the OR operation 78, and further directly connected to output node 73.

Figure 6:
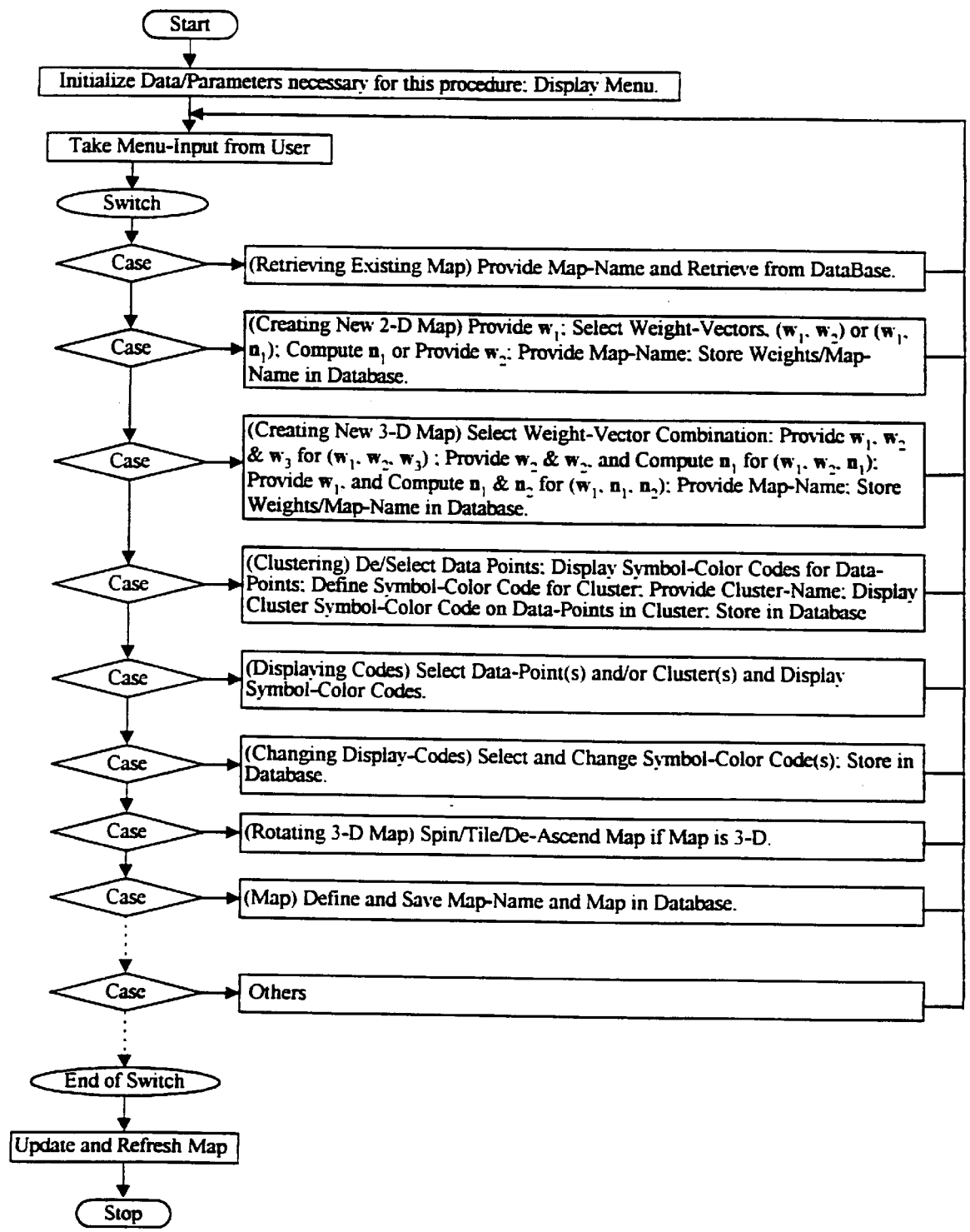
FIG. 6 is a flow chart showing the operations of step 25 of FIG. 2.

Referring back to FIG. 2, FIG. 6 shows an example of a flow chart for performing step 25 which may be a subprogram, procedure, or an independently executable program module (the term procedure is used hereafter). The processes of creating the map and clustering are divided into minor procedures which may be arranged into the switch-case structure found in the C/C++ language, so as to interactively respond to a command a user inputs during the process.

In the case of creating the 2D/3D map, after the map's dimension (either 2D or 3D) is selected, a weight vector combination and coordinate-vector types are specified. According to the selected weight combination the orthogonal weight vectors are calculated accordingly with Eq. A-17, A-18 or A-19; and based on the selected coordinate-vector types projected vectors are computed and plotted along specified coordinates, as described earlier.

The class indicators are displayed, when they are requested, so that distribution-pattern of data points can be examined. If the data points form clusters in the map, member data-points are selected or deselected for each cluster, and a cluster name and display code are specified.

If the distribution pattern of the data-points and spatial relationship among clusters are not satisfactory, or if no cluster is formed, the process of creating the 2D/3D map is repeated. If some of the column vectors $x^i$ ($1 \leq i \leq K$) cannot be clustered, the clustered part is saved; the map and the related weight vectors for the coordinates are stored under a uniquely assigned map name; and then a new 2D/3D map is created. After clustered data-points are fetched, the clustering process is repeated.

In the case of the 3D map, the map is rotated by spinning, tilting and/or de/ascending (elevating) so that the input data's distribution pattern can be investigated three dimensionally, i.e., not only depth of distribution of the data-points within a cluster can be detected, but spatial relationship on cluster's locations can be also observed. Furthermore, with the virtual reality technology users may put themselves in the 3D map, and walk and/or fly through the space of the input data, three-dimensionally scanning the inside of a cluster as well as among clusters.

Figure 7:
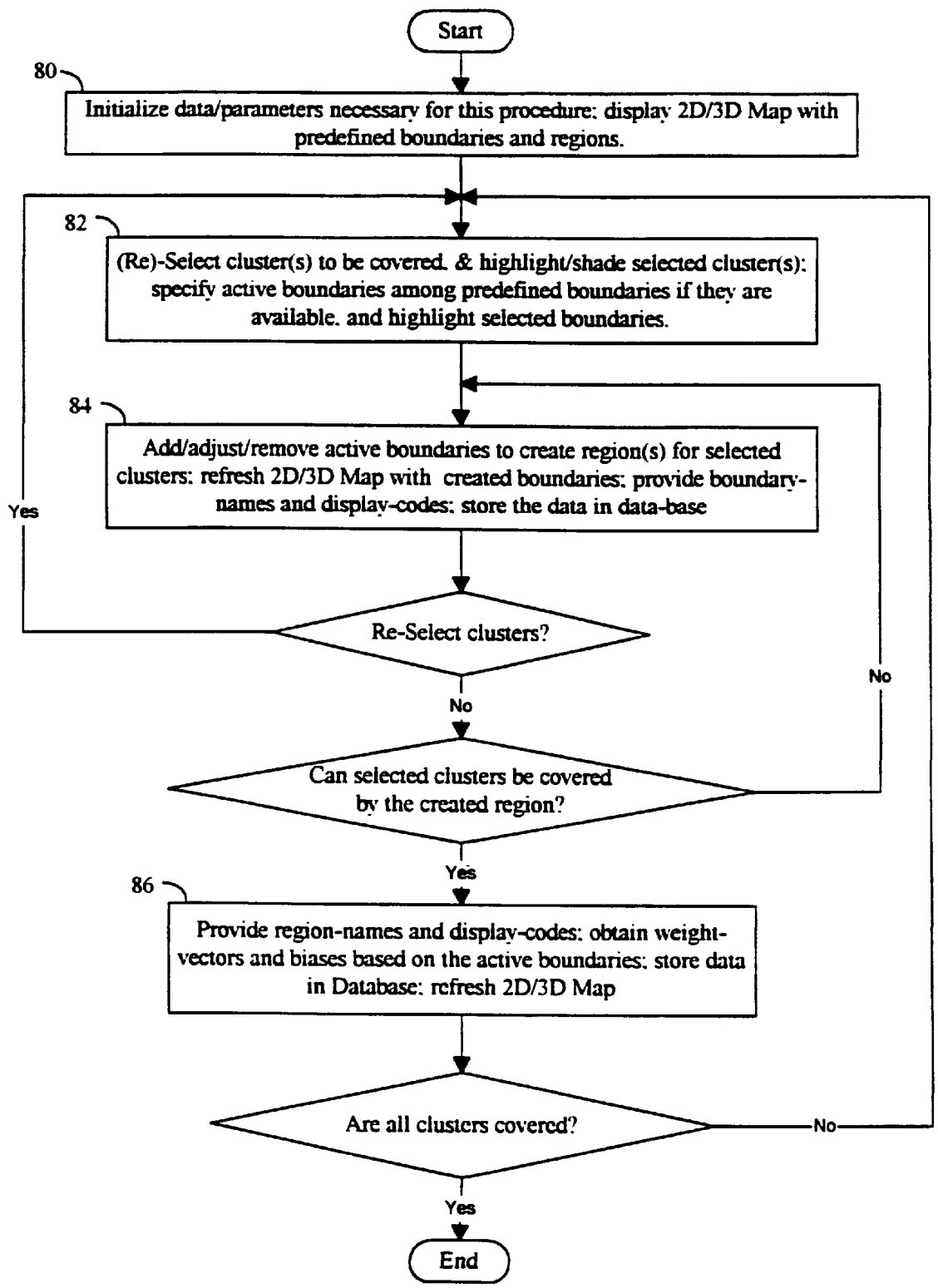
FIG. 7 is a flow chart showing the operations of step 26 of FIG. 2.

Referring to FIG. 7, the operations of step 26 of FIG. 2 is shown in more detail. The steps of FIG. 7 may be realized as part of a computer procedure program. In step 80 of FIG. 7, necessary data/parameters for this procedure are initialized; and the 2D/3D map is displayed with the cluster display-code defined earlier.

At step 82, clusters are selected to be contained in a possible region in the 2D/3D map; data-points in selected clusters are highlighted or shaded to assist in creating a region. If boundaries are defined at earlier steps, active boundaries useful to define the region are selected or de-selected from a set of the boundaries. A side (half-space) of each activated boundary containing the selected clusters is manually identified by users or may be automatically identified by the computer. Those active boundaries and their sides are marked with the aforementioned display-code. If boundaries are not defined earlier steps, step 84 is proceeded immediately.

At step 84, active boundaries are created by: mathematically optimizing a weight vector and a bias respectively with Eqs. A-6 and A-7 based on a vector d representing a targeted region; specifying two points for the 2D map, or three points for the 3D map; graphically drawing a line or a plane by a pointer; or numerically specifying boundary's directional vector. The boundary-names and corresponding display codes are provided by the user.

Each boundary in the 2D/3D map is also interactively adjusted by dragging a part of a boundary so as to increase the magnitude of positive margins on targeted clusters and/or to eliminate non-targeted clusters with negative margins. Defined boundaries and their sides are immediately plotted and marked with the aforementioned display-code, and created regions are also marked accordingly. If there are unnecessary boundaries in the 2D/3D map, they are deleted from the view of the map as well as the data-base.

If some of the selected clusters and/or boundaries are needed to be re-selected or de-selected, the procedure branches back to step 82. If the selected clusters cannot be contained in the created region, then the procedure branches back to step 84.

At step 86, an aforementioned region-name and a corresponding display code are provided by the user. Based on the boundaries new weight vectors and biases are computed, as described earlier, and the results are stored in the database specifically to a related boundary, and are accessible when used to configure artificial neural networks. They can be saved in a vector form, as part of structured data, or as part of an object if operating in an object-oriented programming environment.

If the intended clusters remain unchecked, the procedure branches back to step 82, and the above process is repeated until all of the intended clusters are examined.

Figure 8:
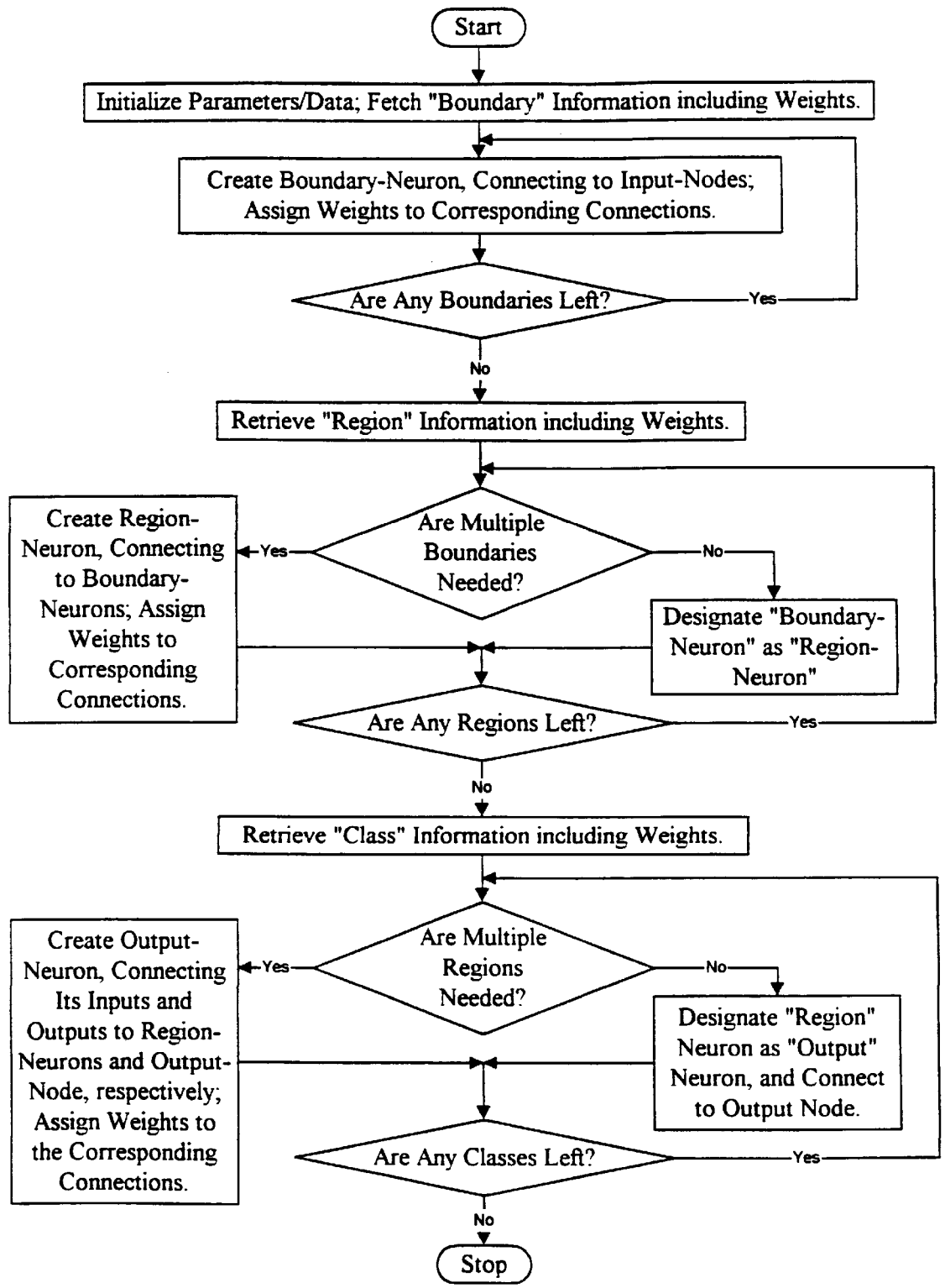
FIG. 8 is a flow chart showing the operations of step 27 of FIG. 2.

After necessary parameters are fetched, the process for configuration of the artificial network's structure of step 27 of FIG. 2 begins with creating artificial neurons forming a boundary tier, as indicated in FIG. 8. First, necessary data is retrieved from the boundary-database stored at the step 26 of FIG. 2, which includes the number of the boundaries defined in the 2D/3D map, and the respective boundary's weight vectors and biases along with the boundary-names. For each boundary an artificial neuron, (termed a boundary neuron hereafter), is created and connected to the input nodes whereas disconnection is made according to the matrix $\Omega$ (per Eq. A-2); respective connection's weights are assigned from the corresponding weight vector. This process to create boundary neurons is repeated for all the boundaries to complete a network's boundary tier.

Next retrieved is the information regarding regions which are defined earlier and stored in the database at the step 26 of FIG. 2, including the number of regions, and the boundary names forming the respective regions, and the weight vectors associated the respective regions. If any region requires multiple boundaries to be defined, an artificial neuron (termed region neuron) is created and connected to the associated boundary neurons; the respective connection's weights are assigned from the corresponding weight vector. For any region which needs a single boundary the boundary neurons corresponding to that boundary is designated as a region neuron. This process is repeated for each region.

The information relating the regions to the classes, which are stored in the database at step 86 in FIG. 7, are retrieved, including the number of classes, the region(s) forming the respective class(es) along with region names, and the related weight vectors. If any of the class(es) consists multiple regions, an artificial neuron (termed output neuron) is created and its input is connected to the necessary region neurons; the respective connection's weights are assigned from the corresponding weight vector. The output neuron's output is connected to the output node. For any class which consists of a single region the region neuron corresponding to that region is connected to the output node. This process is repeated for each class.

Referring to FIGS. 9A through 9F, a numerical example for classification of analog signals is shown consisting of seven groups input patterns, and each group has four patterns, implying 28 raw inputs (K=28). The first and second groups of the patterns are denoted as A1 and A2, respectively; and the third group through the seventh group are alphabetically labeled as B through F. The respective input patterns are represented by the raw input vector $x^i$ (i=1, 2, ..., 28), and are also discretized and fed into 25 nodes, that is N=25. The input data set is represented by the matrix X whose dimension is 25×28, i.e., $X=[x^1, x^2 \ldots, x^{28}]$. Corresponding to the column vectors $x^i$ (i=1, 2, ..., 28) of the matrix X, the following class vector $d_A$ is defined as follows.

$$d_A = (\underbrace{1,1,1,1}_{A1}, \underbrace{1,1,1,1}_{A2}, \underbrace{-1,-1,-1,-1}_{B}, \underbrace{-1,-1,-1,-1}_{C},$$
$$\underbrace{-1,-1,-1,-1}_{D}, \underbrace{-1,-1,-1,-1}_{E}, \underbrace{-1,-1,-1,-1}_{F})$$

After the data matrix X is centered by Eqs. A-5 and A-15 where both R and $R_\zeta$ are set as the identity matrix, the vector $d_A$ is substituted into Eq. A-6 for the optimal weight vector $w^*_1$, and is also used to compute the optimal orthogonal weight vector $n^*_1$ with Eq. A-14 where $\zeta=1$. Based on Eqs. 9 and A-21 the centered vectors, $\sigma^*_1$ and $\mu^*_1$, are obtained for the x- and y-coordinates, respectively. The two-dimensional map for $d_A$ is created with the scaling factors set as $C_\sigma=1$ and $C_{\mu 1}=1$, and is shown in FIG. 10.

The cluster of data-points labeled as A2 are close to the cluster of data-points labeled by C, which creates one large cluster while the rest of the data-points forms another inseparable cluster consisting of data points labeled as A1, and B through F.

Figure 11:
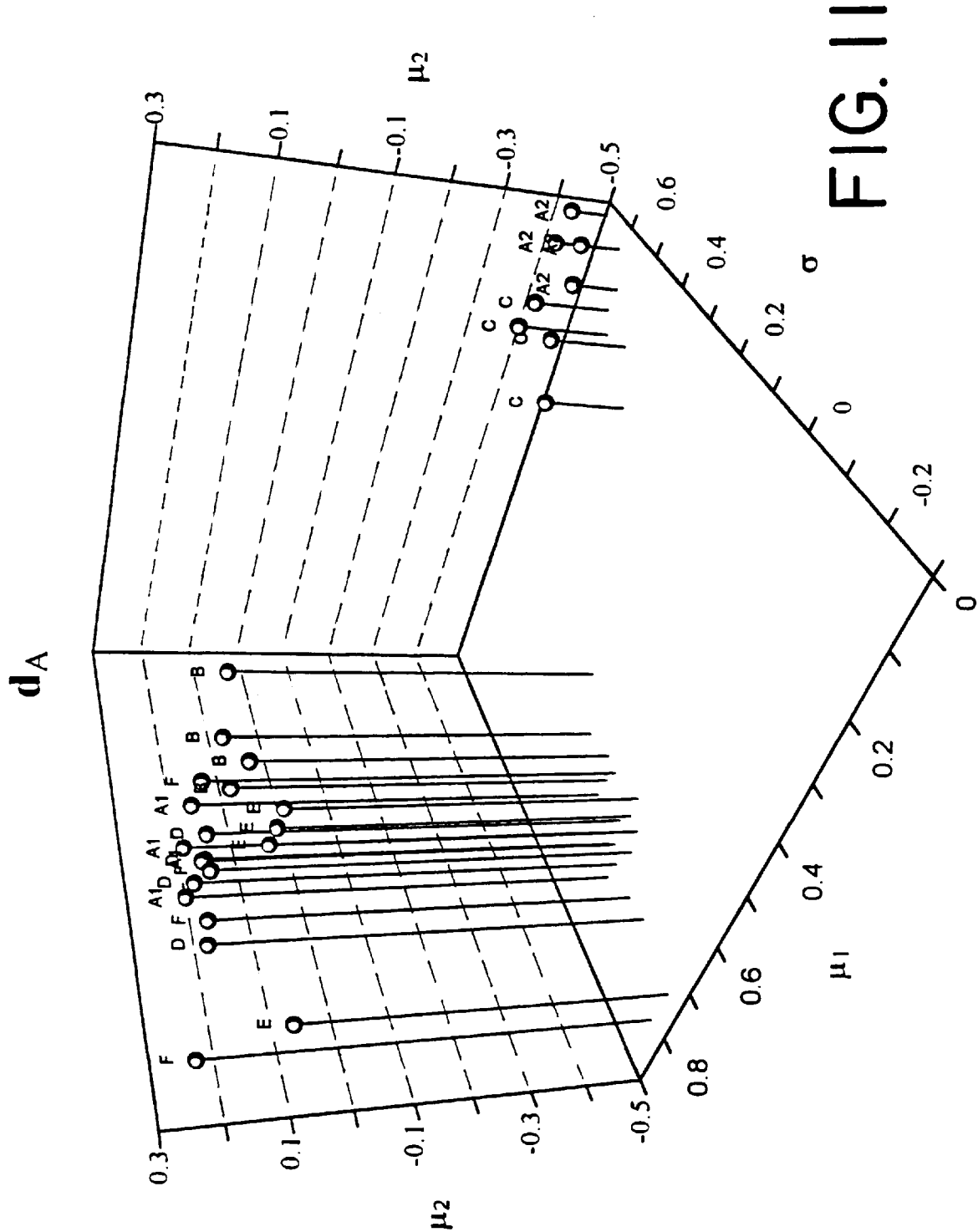
FIG. 11 is a three-dimensional map for building an artificial neural network based on the input patterns of FIGS. 9-A1 through 9-F.

The additional optimal orthogonal weight vector $n^*_2$ is obtained by computing Eq. A-14 where $\zeta=2$, and the corresponding centered vector $\mu^*_2$ is calculated for the z-coordinate with Eq. A-21. When the scaling factor is set as $C_{\mu 2}=1$, the resulted three-dimensional map is shown in FIG. 11.

Figure 10:
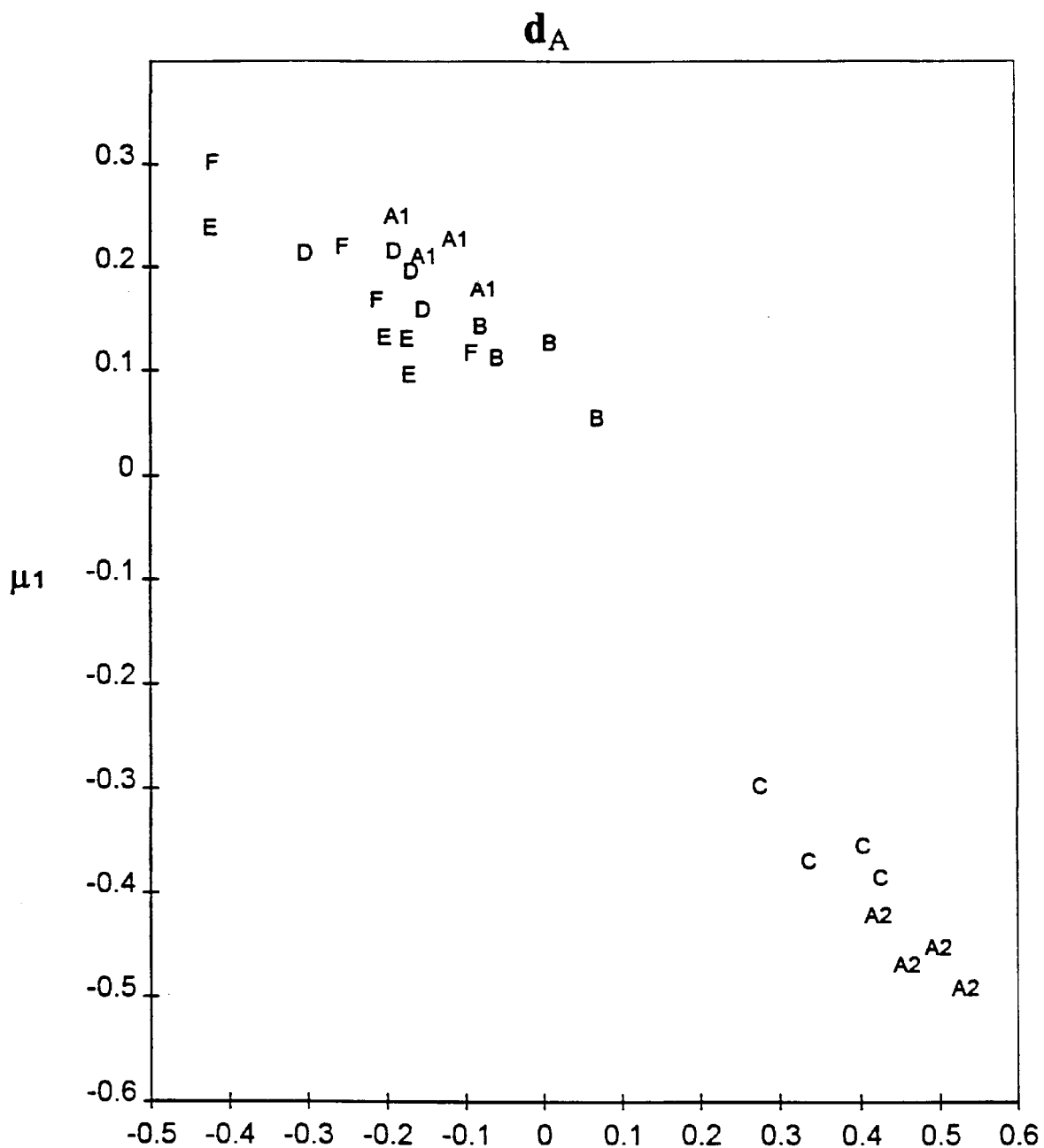
FIG. 10 is a two-dimensional map for building an artificial neural network based on the input patterns of FIGS. 9-A1 through 9-F.

In FIG. 10, data-points for the class A are separated among the two large clusters, data-points of which are labeled as A1 and A2, respectively. The class indicator vector $d_A$ is decomposed into the following two sub-class indicator vectors $d_{A1}$ and $d_{A2}$ according to the locations of the data-points A1 and A2.

$$d_{A1} = (\underbrace{1,1,1,1}_{A1}, \underbrace{-1,-1,-1,-1}_{A2}, \underbrace{-1,-1,-1,-1}_{B},$$
$$\underbrace{-1,-1,-1,-1}_{C}, \underbrace{-1,-1,-1,-1}_{D}, \underbrace{-1,-1,-1,-1}_{E},$$
$$\underbrace{-1,-1,-1,-1}_{F})$$

$$d_{A2} = (\underbrace{-1,-1,-1,-1}_{A1}, \underbrace{1,1,1,1}_{A2}, \underbrace{-1,-1,-1,-1}_{B},$$
$$\underbrace{-1,-1,-1,-1}_{C}, \underbrace{-1,-1,-1,-1}_{D}, \underbrace{-1,-1,-1,-1}_{E},$$
$$\underbrace{-1,-1,-1,-1}_{F})$$

Figure 12:
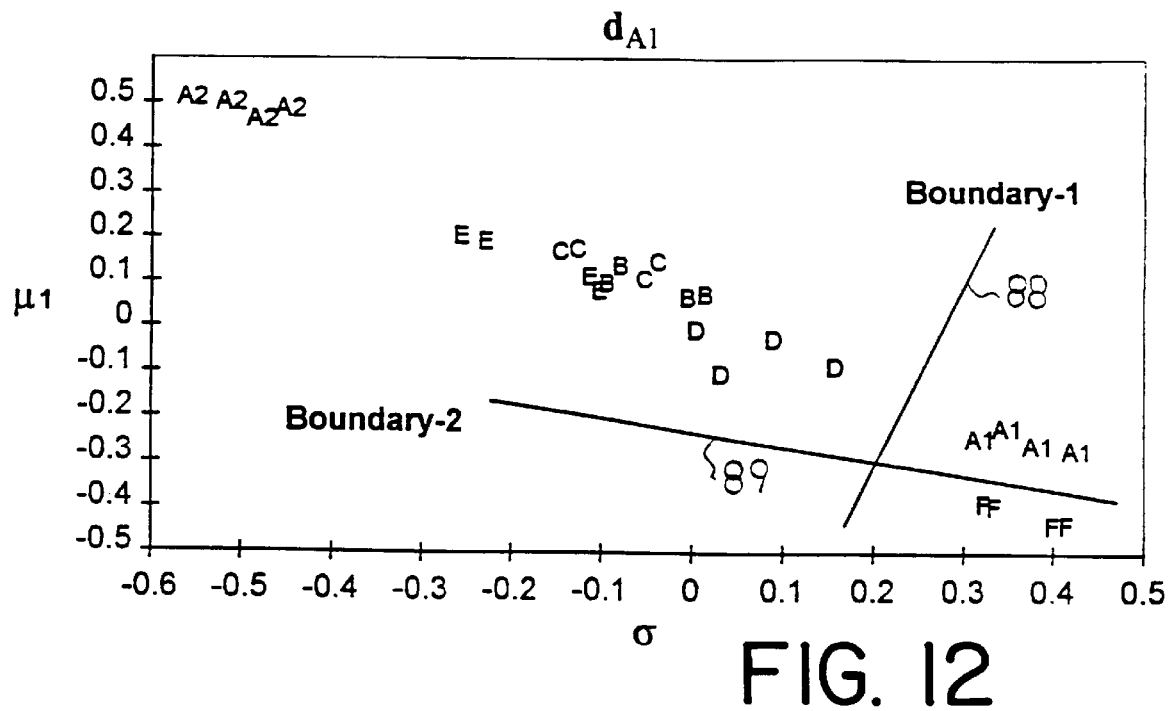
FIGS. 12 and 13 are two-dimensional maps of decomposed vectors of class indicators based on the map of FIG. 10.
Figure 13:
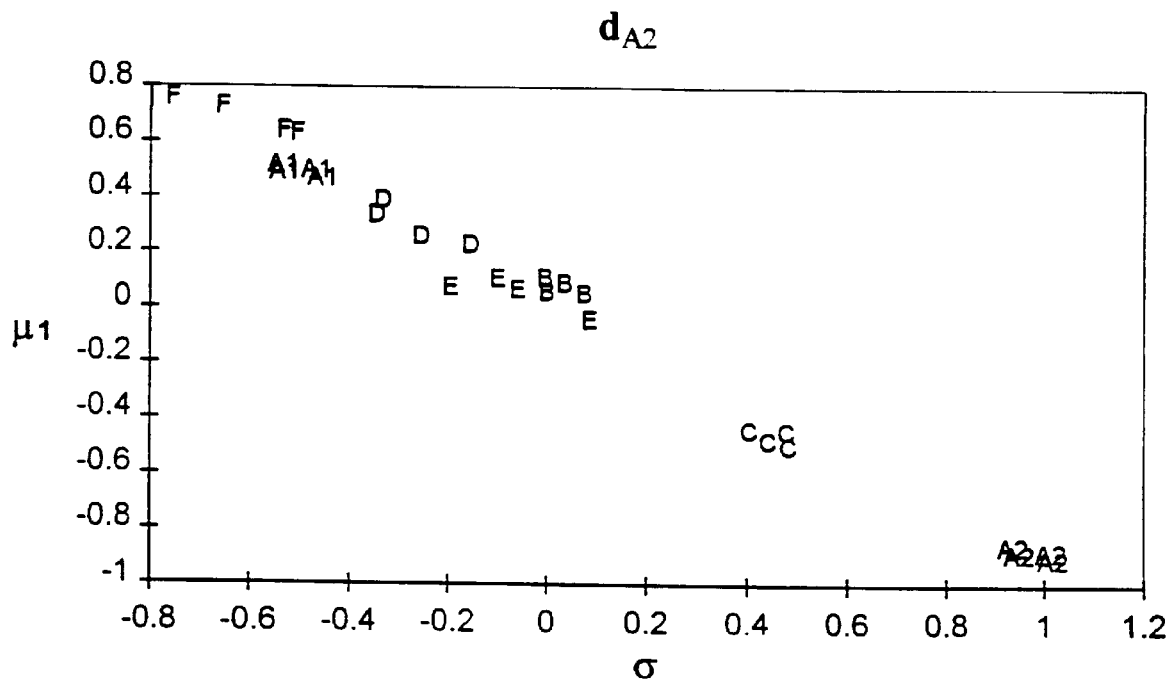

The vectors $\sigma^*_1$ and $\mu^*_1$ are re-calculated for the decomposed vectors $d_{A1}$, and $d_{A2}$, respectively, based on Eqs. 9 and A-21. FIGS. 12 and 13 show the corresponding two-dimensional map of $\sigma^*_1$ and $\mu^*_1$ for the decomposed vectors $d_{A1}$ and $d_{A2}$, respectively, along with the identical data-point identifiers, A1 through F.

In FIG. 12, the cluster of data-points A1 are close to the cluster of data-points F, but both clusters are linearly separable. Since the weight vector $w^*_1$ which is based on $d_{A1}$ and used to calculate the vector $\sigma^*_1$ cannot separate the cluster A1 from the cluster F, an appropriate weight $w^{new}$ is needed to be sought by graphically determining boundaries as indicated in FIG. 12. The boundaries 88 and 89 are labeled Boundary-1 and Boundary-2 in FIG. 12. Boundary-1 separates two clusters A1 and F, and Boundary-2 specifically excludes the cluster F from the rest. The half-space of Boundary-1 is combined with the half-space of Boundary-2, so that a created region is designed to exclusively include the cluster A1.

In FIG. 13, the cluster A2 can be recognized correctly as a part of the class A, when the weight vector $w^*_1$ which is based on $d_{A2}$ and used to calculate the vector $\sigma^*_1$ is utilized as it is, and a bias is adjusted so that the data-points of the clusters C and A2 can retain positive boundary margins.

Next, the network is configured by units which each represent an artificial neuron. In order to define an artificial neuron at the boundary tier, the slope and y-axis height of boundary-1 in FIG. 12 are substituted to Eq. 15 for the neuron-unit's weight vector and Eq. 16 for the associated bias, respectively. The neuron-unit's inputs are directly connected to the input nodes. The vector of the neuron-unit's desired outputs is composed to include the clusters A1 and F, which is denoted as $d_{A1-F}$ and is shown below. The resulted artificial neuron-unit 90 is labeled Unit-1 in the artificial neural network, as shown in FIG. 14.

$$d_{A1-F} = (\underbrace{1,1,1,1}_{A1}, -1,-1,-1,-1,-1,-1,-1,-1,$$
$$-1,-1,-1,-1,-1,-1,-1,-1,-1,-1,-1,-1,$$
$$\underbrace{1,1,1,1}_{F})$$

Figure 14:
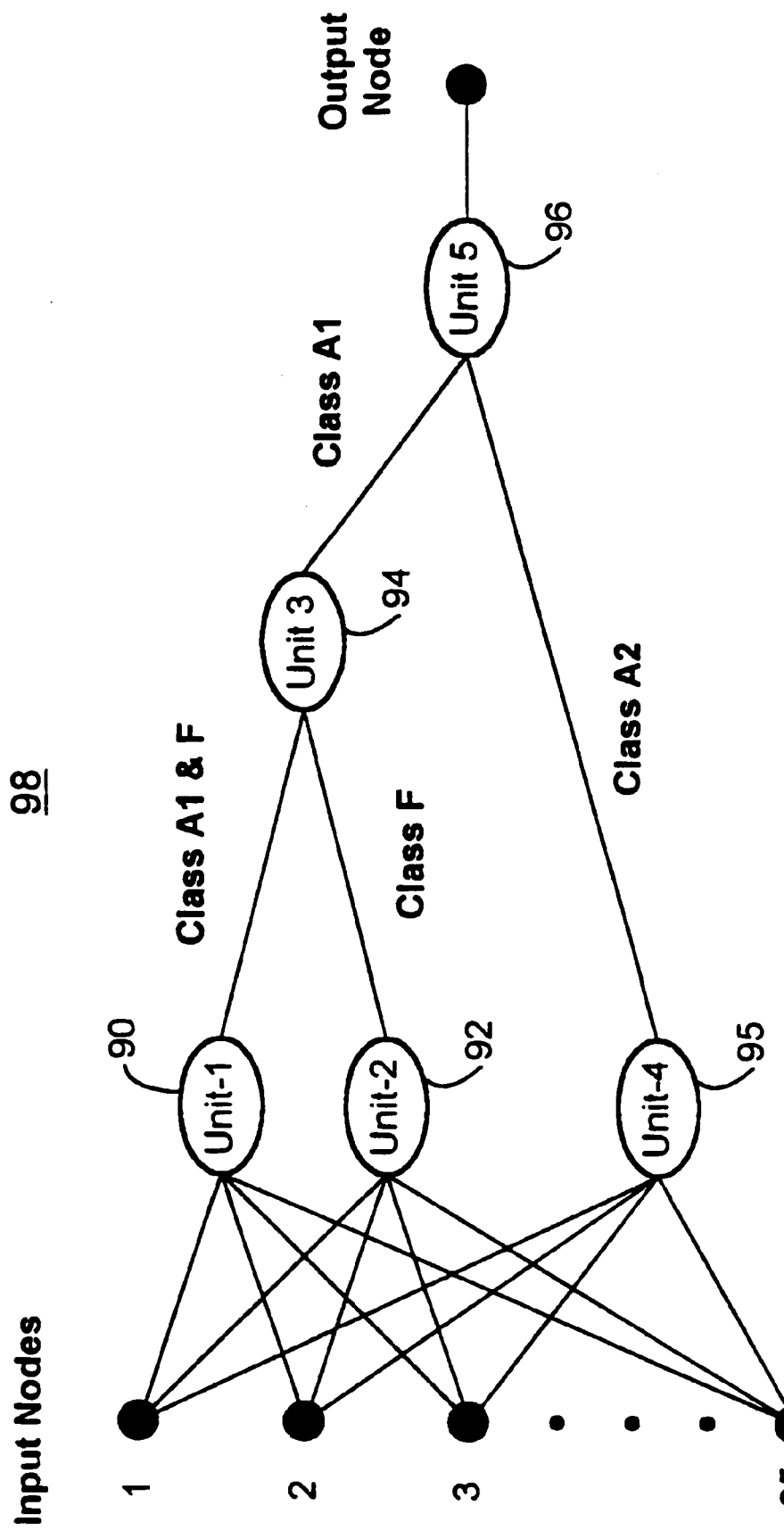
FIG. 14 is a blocked diagram of the artificial neural network corresponding to the maps of FIGS. 12 and 13 to classify the input patterns of FIGS. 9-A1 through 9-F.

For an artificial neuron 92, labeled Unit-2 in FIG. 14, at the boundary tier, the slope and y-axis height of boundary-2 in FIG. 12 is also substituted to Eqs. 15 and 16 for the unit's weight vector and bias, respectively. The neuron-unit's inputs are directly connected to the input nodes; and the Unit-2 desired output vector is represented by $d_F$ corresponding to the cluster F.

$$d_F = (\underbrace{-1, -1, -1, -1, -1, -1, -1, -1, -1, -1, -1, -1,}_{}$$
$$\underbrace{-1, -1, -1, -1, -1, -1, -1, -1, -1, -1, -1, -1,}_{F}$$
$$\underbrace{1, 1, 1, 1)}_{F}$$

The Unit-1 and Unit-2 are connected to the artificial neuron 94, labeled Unit-3, at the Region tier, as indicated in FIG. 14, which is designed to exclusively recognize the cluster F. The respective desired outputs for Unit-1 and Unit-2, $d_{A1\text{-}F}$ and $d_F$, become inputs for Unit-3, which are compiled as $X^T = [d_{A1\text{-}F}, d_F]$. Desired outputs for the Unit-3 are characterized as the vector $d_{A1}$. Applying Eqs. A-6 and A-7 yields such an optimal weight vector and bias as $w_3 = (1,-1)^T$ and $w_{03} = 0$, respectively, both of which in effect create a region exclusively containing the cluster F.

The inputs of the Unit-3 at the boundary tier are directly connected to the input nodes, whose weights are computed by Eq. 15 with the vector $d_{A2}$ and used for the vector $\sigma^*_1$ in FIG. 13. The unit's bias is adjusted at the middle-point between the clusters, so that its output exclusively recognize the subclass A2 with positive boundary margins. This is shown by artificial neuron 95, labeled Unit-4 in FIG. 14.

The Units-3 and -4 are connected to the artificial neuron 96, labeled Unit-5, at the Output tier in FIG. 14. The Unit-5 combines the respective outputs from Units-3 and -4 by the regular OR operation to complete the class A by logically totaling the sub-classes A1 and A2. As the desired outputs for Units-3 and -4 are represented as inputs for the Unit-5, an input matrix of which becomes $X^T = [d_{A1}, d_{A2}]$; and its desired outputs are described as the vector $d_A$. Similarly, applying Eqs. A-6 and A-7 yields such an optimal weight vector and bias as $w_5 = (1,\_1)^T$ and $w_{05} = 0$, respectively. The connectivity of neurons 90, 92, 94, 95 and 96 in artificial network 98 are thus based on the geometry of the regions of clustered data points in the maps of FIGS. 12 and 13. In this example, artificial network structure 98 is determined as a mixed layer structure in which one to three-layer parts are combined, i.e., for each part the necessary number of the layers and the neuron units as well as their connection pattern are identified according to relative relationship among clusters of data points.

In summary, the system includes a programmed computer for visualizing an input data with a two-dimensional map on an output device, such as a display, by calculating a linear combination of an input data vector with an artificial neuron's weight vector, as one of the map's coordinate axes, and at another axis an optimal-orthogonal weights. An optimal-orthogonal weight vector is derived by differentiating a potential function which comprises a ridge term for numerical stability. In the map, each input vector can be represented by a point and relative location among such points and are examined in terms of respective class-indicators. The map's dimension may be increased to three for visual added depth, but can be generalized for a greater dimension. Further, either a user, or the computer, defines linear boundaries in the map based on the point distribution of the map, such that the positiveness of boundary-margins of the input data provides for correct classification, and converts the linear boundary into a new weight vector and a bias for an artificial neuron in terms of a linear combination between weight vectors used for the map's axes. The synapse-weights and thresholds of the artificial neurons are based on a closed form analysis of the linear boundaries.

From the foregoing description, it will be apparent that there has been provided an improved system and method for building an artificial neural network. Variations and modifications in accordance with the invention will undoubtedly suggest themselves to those skilled in the art. Accordingly, the foregoing description should be taken as illustrative and not in a limiting sense.

APPENDIX A

Equations $$s = X^T w \tag{1}$$

$$u = s + w_0 1 \tag{2}$$

$$J_P = [d-y]^T [d-y] \tag{3}$$

$$J_c = [d-u]^T [d-u] \tag{4}$$

$$\left[ \begin{pmatrix} X \\ 1^T \end{pmatrix} (X^T 1) \right] \begin{pmatrix} w^* \\ w_0^* \end{pmatrix} = \begin{pmatrix} X \\ 1^T \end{pmatrix} d \tag{5}$$

$$C = [I - (1/K)11^T] \tag{6}$$

$$\Xi = X^T - 1\bar{x}^T \tag{7}$$

$$s_i^* = X^T w_i^* \tag{8}$$

$$\sigma_i^* = \Xi_R w_i^* \tag{9}$$

$$u_i^* = s_i^* + w_{0i}^* 1 \tag{10}$$

$$\left. \begin{array}{l} s_i^* = x^T w_i^* \\ u_i^* = s_i^* + w_{0i}^* \\ \sigma_i^* = s_i^* - \bar{w}_{0i}^* \end{array} \right\} \tag{11}$$

$$\left. \begin{array}{l} m_\zeta^* = x^T n_\zeta^* \\ v_\zeta^* = m_\zeta^* + n_{0\zeta}^* \\ \mu_\zeta^* = m_\zeta^* - \bar{n}_{0\zeta}^* \end{array} \right\} \tag{12}$$

$$w^{new} = \alpha C_x w_1^{*T} + \beta C_y w_2^{*T} + \gamma C_z w_3^{*T} \tag{13}$$

$$w_0^{new} = \alpha C_x w_{01}^* + \beta C_y n_{01}^* + \gamma C_z n_{02}^* + \delta \tag{14}$$

$$w^{new} = \alpha C_x w_1^{*T} + \beta C_y w_2^{*T} \tag{15}$$

$$w_0^{new} = \alpha C_x w_{01}^* + \beta C_y w_{02}^* + \delta \tag{16}$$

$$J_{PFO} = (r/2) u^T R u - q^T u + (k/2) w^T I_w w \tag{A-1}$$

$$\Omega w = 0^{NP} \tag{A-2}$$

$$L_0 = -d^T (X^T 1) \begin{pmatrix} w \\ w_0 \end{pmatrix} + \tag{A-3}$$
$$(1/2)(w^T w_0^T) \begin{bmatrix} rXRX^T + kI_w & rXR1 \\ r1^T RX^T & r1^T 1 \end{bmatrix} \begin{pmatrix} w \\ w_0 \end{pmatrix} + \lambda^T \Omega w$$

$$\begin{bmatrix} (r\Xi^T R_x \Xi + kI_w) & \Omega^T \\ \Omega & 0 \end{bmatrix} \begin{bmatrix} w \\ \lambda \end{bmatrix} = \begin{bmatrix} \Xi^T q \\ 0 \end{bmatrix} \tag{A-4}$$

$$C_R = \sqrt{R} [R^{-1}(1/R)11^T] \sqrt{R} \tag{A-5}$$

$$w_{opt} = (N^{-1} - N^{-1}\Omega^T M^{-1}\Omega N^{-1}) \Xi_R^T q_R \tag{A-6}$$

$$w_{0opt} = \frac{1}{R} \left( \frac{1^T q}{r} - 1^T RX^T w_{opt} \right) \tag{A-7}$$

-continued $$w_i^{*T} n_\zeta = 0 \atop n_j^{*T} n_\zeta = 0 \Big\} \quad \text{(A-8)}$$

$$m_\zeta = X^T n_\zeta \quad \text{(A-9)}$$

$$v_\zeta = m_\zeta + n_{0\zeta} 1 \quad \text{(A-10)}$$

$$J_{PF\zeta} = (r_\zeta/2) v_\zeta^T R_\zeta v_\zeta - q^T u + (k_\zeta/2) n_\zeta^T I_{n_\zeta} n_\zeta \quad \text{(A-11)}$$

$$(r_\zeta X R_\zeta X^T + k_\zeta I_{n_\zeta}) n_\zeta + r_\zeta X R_\zeta 1 n_{0\zeta} - \quad \text{(A-12)}$$

$$Xq + \lambda_\zeta^1 w^* + \sum_{i=1}^{\zeta-1} \lambda_\zeta^{i+1} n_i^* + \Omega^T \lambda = 0$$

$$r_\zeta 1^T R_\zeta X^T n_\zeta + r_\zeta R_\zeta n_{0\zeta} - 1^T q = 0 \quad \text{(A-13)}$$

$$n_\zeta^* = \left[ P_\zeta - P_\zeta V_{\zeta-1} (V_{\zeta-1}^T P_\zeta V_{\zeta-1})^{-1} V_{\zeta-1}^T P_\zeta \right] P_\zeta \Xi_{R\zeta}^T q_{R\zeta} \quad \text{(A-14)}$$

$$C_\zeta = \sqrt{R_\zeta} \left[ R_\zeta^{-1} - \left( \frac{1}{R_\zeta} \right) 11^T \right] \sqrt{R_\zeta} \quad \text{(A-15)}$$

$$n_{0\zeta}^* = \frac{1}{R_\zeta} \left( \frac{1^T q}{r_\zeta} - 1^T R_\zeta X^T n_\zeta^* \right) \quad \text{(A-16)}$$

$$n_1^* = \left[ P_1 - P_1 w^* (w^{*T} P_1 w^*)^{-1} w^{*T} P_1 \right] P_1 \Xi_{RI}^T q_{RI} \quad \text{(A-17)}$$

$$n_2^* = \left[ P_2 - P_2 V_1 (V_1^T P_2 V_1)^{-1} V_1^T P_2 \right] P_2 \Xi_{R2}^T q_{R2} \quad \text{(A-18)}$$

$$n_1^* = \left[ P_1 - P_1 V_0 (V_0^T P_1 V_0)^{-1} V_0^T P_1 \right] P_1 \Xi_{RI}^T q_{RI} \quad \text{(A-19)}$$

$$m_\zeta^* = X^T n_\zeta^* \quad \text{(A-20)}$$

$$\mu_\zeta^* = \Xi_{R\zeta} n_\zeta^* \quad \text{(A-21)}$$

$$v_\zeta^* = m_\zeta^* + n_{0\zeta}^* 1 \quad \text{(A-22)}$$

APPENDIX B

POTENTIAL FUNCTION WITH RIDGE TERM

In this appendix, derived is an equation for optimal weight vector, which is improved to be numerically robust, and then the equation is extended to optimal orthogonal weight vectors.

The aforementioned type of the potential function is utilized with some modifications. Its quadratic term for the linear-combiner 5 is adjusted with a matrix R, that is—$u^T Ru$; and the Ridge term, $w^T I_w w$, is added for numerical stabilization in the cases of the nearly singular or singular data-matrix. The modified potential function $J_{PF0}$ becomes $$J_{PF0} = (r/2) u^T R u - q^T u + (r/2) w^T I_w w \quad \text{(A-1)}$$

where R is a symmetric "positive-definite" and K×K dimensional matrix, $I_w$ is a symmetric "semi-positive definite" N×N matrix, r and k are, respectively, positive and semi-positive scalar coefficients. The matrix R specifies weighing factors for the vector u, and can be set as the identity matrix if the weighing factors are identical.

OPTIMAL WEIGHTS

Since it is necessary in some applications to exclude a certain part of the weight vector w from the optimization, a weight-constraint matrix $\Omega$ is introduced to specify such $N^P$ weights. The $N^P \times N$ dimensional matrix $\Omega$ is constructed so that each row and each column contain a single element of a positive one, maintaining its row rank to be full (i.e. $N^P$). By imposing zero to the constrained weights, the pruning is expressed as a linear equation, $$\Omega w = 0^{N^P} \quad \text{(A-2)}$$

where $0^{N^P}$ is an $N^P$-dimensional zero vector. It is easily seen that the matrix $\Omega$ has characteristics of the permutation matrix, that $[\Omega]^{-\#} = [\Omega]^T$ and $\Omega \Omega^T = I^{N^P}$ where $(.)^{-\#}$ denotes the Moore-Penrose inverse (as described in Magnus, J. R. & Neudecker, H. (1988) *Matrix Differential Calculus with Applications in Statistics and Econometrics*, New York: John Wiley & Sons); and $I^{N^P}$ denotes an $N^P$-dimensional identity matrix.

When the above constraint Eq. A-2 is incorporated into the potential function $J_{PF0}$ Eq. A-1, the Lagrangean $L_0$ is defined as $$L_0 = -d^T (X^T 1) \binom{w}{w_0} + \quad \text{(A-3)}$$
$$(1/2)(w^T w_0^T) \begin{bmatrix} rXRX^T + kI_w & rXR1 \\ r1^T RX^T & r1^T 1 \end{bmatrix} \binom{w}{w_0} + \lambda^T \Omega w$$

where $\lambda$ denotes a compatibly-dimensioned Lagrange multiplier vector. The Lagrangean $L_0$, Eq. A-3, is differentiated with respect to w, $w_0$, and $\lambda$ (as described in Rogers, G. S. (1980) *Matrix Derivatives*, New York: Marcel Dekker, Inc.), and application of the zero slope optimality condition yields $$(rXRX^T + kI_w) w + rXR1 w_0 - Xd + \Omega^T \lambda = 0$$

$$r1^T RX^T w + r1^T R1 w_0 - 1^T d = 0$$

When the above equations are combined to eliminate the bias terms, the obtained equation can be expressed together with the pruning constraint Eq. A-2 as $$\begin{bmatrix} (r\Xi_R \Xi_R^T + kI_w) & \Omega^T \\ \Omega & 0 \end{bmatrix} \begin{bmatrix} w \\ \lambda \end{bmatrix} = \begin{bmatrix} \Xi_R^T d_R \\ 0 \end{bmatrix} \quad \text{(A-4)}$$

The matrix $\Xi_R$ in Eq. A-4 is the R-centered version of the data-matrix X given by $\Xi_R = C_R X_R^T$. The R-adjusted data matrix $X_R$ is given by $X_R = X \sqrt{R}$, and the centering matrix $C_R$ is obtained by $$C_R = \sqrt{R} [R^{-1} (1/R) 11^T] \sqrt{R} \quad \text{(A-5)}$$

where $R = 1^T R 1$, and $\sqrt{R}$ is a symmetric "positive-definite" divisor matrix satisfying $R = \sqrt{R} \sqrt{R}$.

After a general expression for the particular solution (Magnus & Neudecker, 1988) is applied to Eq. A-4, the optimal weight vector $w_{opt}$ is found to be $$w_{opt} = (N^{-1} - N^{-1} \Omega^T M^{-1} \Omega N^{-1}) \Xi_R^T d_R \quad \text{(A-6)}$$

where $N = (r \Xi_R^T \Xi_R + kI_w + \Omega^T \Omega)$, $M = \Omega N^{-1} \Omega^T$, and $d_R = (\sqrt{R})^{-1} d$. The optimal bias $w_{0opt}$ is given in terms of the optimal weight vector $w_{opt}$ by $$w_{0opt} = [(1^T q/r) - 1^T R X^T w_{opt}]/R \quad \text{(A-7)}$$

The presence of $\Omega^T \Omega$ and $kI_w$ in the matrix N increases numerical stability in computing its inverse matrix of the centered data matrix $\Xi_R$. As mentioned in the background section, the coefficient k is needed to be compromised to balance the numerical stability and the extent of a skewed solution. For the non-Ridge case the coefficient k can be set as k=0, and the obtained weight vector is fully optimized without being skewed. When there is no weight constraint, the matrix $\Omega$ can be set as a zero matrix in the optimal weight vector Eq. A-6, leading to $$w_{opt} = (r \Xi_R^T \Xi_R + k I_w)^{-1}.$$

OPTIMAL ORTHOGONAL WEIGHT VECTORS

A mathematical equation is derived to obtain an optimized weight vector that is orthogonal not only to a set of given weight vectors but also to a set of mutually orthogonal weight vectors. The former set consists of $M_w$ weight vectors, denoted by $w^*_1, w^*_2, \ldots, w^*_{M_w}$, where $M_w$ indicates the number of the given weight vectors. The latter set consists of $M_n$ mutually-orthogonal weight vectors, denoted by $n^*_1, n^*_2, \ldots, n^*_{M_n}$ where $M_n$ indicates the number of such weight vectors. There are theoretical limits on the possible maximum of those numbers $M_w$ and $M_n$, which include such conditions as $M_w + M_n \leq N$, $1 \leq M_w \leq N$ and $0 \leq M_n \leq N$.

Let $n_\zeta$ denote the $\zeta$th orthogonal vector belonging to the (non-empty) latter set of $n^*_1, n^*_2, \ldots, n^*_{M_n}$ where $\zeta$ indicates an integer index satisfying $1 \leq \zeta \leq M_n$. Then, the aforementioned two orthogonality conditions for the vector $n_\zeta$ are described as $$\left. \begin{array}{c} w_i^{*T} n_\zeta = 0 \\ n_j^{*T} n_\zeta = 0 \end{array} \right\} \quad \text{(A-8)}$$

where the ranges of the integer indexes i and j are set as $1 \leq i \leq M_w$ and $1 \leq j \leq \zeta$, respectively.

Corresponding to the vectors s and u in Eqs. 1 and 2, K-dimensional vectors, $m_\zeta$ and $v_\zeta$ are respectively defined as $$m_\zeta = X^T n_\zeta \quad \text{(A-9)}$$

$$v_\zeta = m_\zeta + n_{0\zeta} 1 \quad \text{(A-10)}$$

where $n_{0\zeta}$ indicates a bias. Correspondingly the Potential Function $J_{PF\zeta}$ is defined as $$J_{PF\zeta} = (r_\zeta/2) v_\zeta^T R_{70} v_\zeta - d^T v_\zeta + (k_\zeta/2) n_\zeta^T I_{n\zeta} n_\zeta \quad \text{(A-11)}$$

where $R_\zeta$ is a symmetric "positive-definite" and K×K dimensional matrix, $I_{n\zeta}$ denotes a symmetric "positive-definite" matrix, $r_\zeta$ is positive ($r_\zeta > 0$), and $k_{70}$ is semi-positive ($k_\zeta \geq 0$).

When the linear constraint for the weight constraint Eq. A-2 and the orthogonality conditions Eq. A-8 are incorporated into the potential function $J_{PF\zeta}$, Eq. A-11, the Lagrangean $L_n$ is defined as $$L_n = J_{PF\zeta} + \sum_{i=1}^{M_w} \lambda_\zeta^i w_i^{*T} n_\zeta + \sum_{j=1}^{\zeta-1} \lambda_\zeta^{j+M_w} n_j^{*T} n_\zeta + \lambda_n^T \Omega n_\zeta$$

where $\lambda_\zeta^i$ and $\lambda_\zeta^{j+M_w}$ are the Lagrange multiplier (scalar) variables for $w^*_i$ and $n^*_j$ respectively, $\lambda_n$ denotes the Lagrange multiplier vector for the weight-constraint matrix $\Omega$, and $r_\zeta$ and $k_\zeta$ are positive and semi-positive scalar coefficients, respectively.

After the Lagrangean $L_n$ is differentiated with respect to $n_\zeta$ and $n_{0\zeta}$, application of the zero-slope optimality condition yields the following linear equations.

$$(r_\zeta X R_\zeta X^T + k_\zeta I_{n\zeta}) n_\zeta + r_\zeta X R_\zeta 1 n_{0\zeta} - \quad \text{(A-12)}$$

$$Xd + \sum_{i=1}^{M_w} \lambda_\zeta^i w_i^* + \sum_{j=1}^{\zeta-1} \lambda_\zeta^{j+M_w} n_j^* + \Omega^T \lambda_n = 0$$

$$r_\zeta 1^T R_\zeta X^T n_\zeta + r_\zeta R_\zeta n_{0\zeta} - 1^T d = 0 \quad \text{(A-13)}$$

The above equations are combined to eliminate the bias terms, solved for the Lagrange multiplier vector $\lambda_n$, and substituted back to the combined equation. Then, the orthogonality condition Eq. A-8 is applied to obtain a relation for the Lagrange multiplier (scalar) variables $\lambda_\zeta^i$ and $\lambda_\zeta^{j+M_w}$. Substituting that relation back, again, to the combined equation yields the $\zeta$th optimal orthogonal weight vector $n^*_\zeta$ $$n^*_\zeta [P_\zeta - P_\zeta V_{\zeta-1} (V_{\zeta-1}^T P_\zeta V_{\zeta-1})^{-1} V_{\zeta-1}^T R_\zeta] P_\zeta \Xi_{R\zeta}^T d_{R\zeta} \quad \text{(A-14)}$$

where $P_\zeta$ is defined as $P_{\zeta=(N_\zeta}^{-1} - N_\zeta^{-1} \Omega^T M_\zeta^{-1} \Omega N_\zeta^{-1})$, $V_{\zeta-1}$ is a K×(M+$\zeta$-1) dimensional matrix, defined as $V_{\zeta-1} = (w^*_1, w^*_2, \ldots, w^*_{M_w}, n^*_1, n^*_2, \ldots n^*_{\zeta-1})$, several matrices are respectively given by $$N_\zeta = r_\zeta \Xi_{R\zeta}^T \Xi_{R\zeta} + \Omega^T \Omega + \sum_{i=1}^{M_w} w_i^{*T} w_i^* + \sum_{j=1}^{\zeta-1} n_j^{*T} n_j^* + k_\zeta I_{n\zeta},$$

$$M_\zeta = \Omega N_\zeta^{-1} \Omega^T, \quad d_{R\zeta} = \left(\sqrt{R_\zeta}\right)^{-1} d,$$

$$\Xi_{R\zeta} = C_{R\zeta} X_{R\zeta}^T, \quad X_{R\zeta} = X \sqrt{R_\zeta}, \quad \sqrt{R_\zeta}$$

is a symmetric "positive-definite" divisor matrix for $R_\zeta$, that is $$R_\zeta = \sqrt{R_\zeta} \sqrt{R_\zeta}.$$

With $R_\zeta = (1^T R_\zeta 1)$ the centering matrix $C_{R\zeta}$ is defined as $$C_{R\zeta} = \sqrt{R_\zeta} [R_\zeta^{-1} - (1/R_\zeta) 11^T] \sqrt{R_\zeta}. \quad \text{(A-15)}$$

From Eq. A-13 the $\zeta$th bias $n^*_{0\zeta}$ is determined by $$n^*_{0\zeta} = \frac{1}{R_\zeta} \left( \frac{1^T q_\zeta}{r_\zeta} - 1^T R_\zeta X^T n_\zeta^* \right). \quad \text{(A-16)}$$

Although the matrix N, includes the terms of $$\sum_{i=1}^{M_w} w_i^{*T} w_i^* \text{ and } \sum_{j=1}^{\zeta-1} n_j^{*T} n_j^*,$$

the inclusion is entirely optional, but generally increases numerical stability, especially when the "range-spaces" in the vector space of $w^*_i$ and $n^*_j$ are not included either by that of the data matrix X or by that of the weight-constraint matrix $\Omega$. However, it poses no benefit and can be set as zero, when the range space of $w^*_i$ or $n^*_j$ is covered by that of the data matrix X. The stability role of $\Omega^T \Omega$ and $k_{\zeta I n \zeta}$ in the matrix $N_\zeta$ is the same as that for the matrix N in Eq. A-6.

The solution, Eq. A-14, for the optimal orthogonal vector is applied for the following three special cases which are useful to construct the two or three dimensional map based on the present invention.

(1) Case of One Optimal Orthogonal Vector $n^*_\zeta$ Based on One Weight Vector $w^*_1$ When the index is set as $\zeta=1$ along with $M_w=1$ for the weight vector $w^*_1$, the matrices $P_\zeta$, $N_\zeta$ and $V_{\zeta-1}$ become $P_1=(N_1^{-1}-N_1^{-1}\Omega^T M_1^{-1}\Omega N_1^{-1})$, $N_1=r_1\Xi_{R1}{}^T\Xi_{R1}+\Omega^T\Omega+w_1{}^{*T}w^*_1+k_1I_{n1}$, and $V_0=w^*_1$, respectively. The optimal orthogonal vector $n^*_1$ is obtained by.

$$n^*_1 = [P_1 - P_1 w^*_1 (w_1^{*T} P_1 w^*_1)^{-1} w_1^{*T} P_1] P_1 \Xi_{R1}{}^T d_{R1} \qquad \text{(A-17)}$$

(2) Case of Two Optimal Orthogonal Vectors $n^*_1$ and $n^*_2$ Based on One Weight Vector $w^*_1$ The first optimal vector $n^*_1$, orthogonal to $w^*_1$, is given by Eq. A-17; and the second optimal orthogonal vector $n^*_2$ is obtained based on the two vectors $w^*_1$ and $n^*_1$. When the index is set as $\zeta=2$ along with $M_w=1$, the matrices $P_\zeta$, $V_{-1}$ and $N_\zeta$ respectively become $V_1=(w^*_1, n^*_1)$, $P_2=(N_2^{-1}-N_2^{-1}\Omega^T M_2^{-1}\Omega N_2^{-1})$ and $N_2=r_2\Xi_{R2}{}^T\Xi_{R2}+\Omega^T\Omega+w_1{}^{*T}w^*_1+n_1{}^{*T}n^*_1+k_2I_{n2}$, and then the second optimal orthogonal vector $n^*_2$ is obtained by $$n^*_2 = [P_2 - P_2 V_1 (V_1^T P_2 V_1)^{-1} V_1^T P_2] P_2 \Xi_{R2}{}^T d_{R2} \qquad \text{(A-18)}$$

(3) Case of One Optimal Orthogonal Vector $n^*_1$ Based on Two Weight Vectors $w^*_1$ and $w^*_2$ When the index $\zeta$ becomes $\zeta=1$ in Eq. A-14 and $M_w$ is set as $M_w=2$ for the weight vectors $w^*_1$ and $w^*_2$, the matrices $P_\zeta$, $V_{\zeta-1}$ and $N_\zeta$ become $P_1=(N_1^{-1}-N_1^{-1}\Omega^T M_1^{-1}\Omega N_1^{-1})$, $V_0=(w^*_1, w^*_2)$ and $N_1=r_1\Xi_{R1}{}^T\Xi_{R1}+\Omega^T\Omega+w_1{}^{*T}w^*_1+w_2{}^{*T}w^*_2+k_1I_{n1}$, and the optimal orthogonal vector $n^*_1$ is obtained by $$n^*_1 = [P_1 - P_1 V_0 (V_0^T P_1 V_0)^{-1} V_0^T P_1] P_1 \Xi_{R1}{}^T d_{R1} \qquad \text{(A-19)}$$

PROJECTED VECTOR

Based on the optimal orthogonal vector $n^*_\zeta$, projected vectors similar to $s^*_i$, $\sigma^*_i$ and $u^*_i$ are obtained as $$m^*_\zeta = X^T n^*_\zeta, \qquad \text{(A-20)}$$

and the centered vector of $m^*_\zeta$ ($1 \leq \zeta \leq M_n$) is determined by $$\mu^*_\zeta = \Xi_{R\zeta} n^*_\zeta. \qquad \text{(A-21)}$$

The bias $n^*_{0\zeta}$ ($1 \leq \zeta \leq M_n$) is calculated by substituting $n^*_\zeta$ into Eq. A-16, or can be treated as an adjustable parameter to translate the projected vector $m^*_\zeta$, an expression of which is given by $$v^*_\zeta = m^*_\zeta + n^*_{0\zeta} 1 \qquad \text{(A-22)}$$

where the index $\zeta$ satisfies the range, $1 \leq \zeta \leq M_n$.

What is claimed is:

1. A system for building an artificial neural network of artificial neurons on a computer interactively with a user using input data representing patterns of different classes of signals comprising:

means for analyzing said input data to generate one or more data points in at least two dimensions representative of said signals in each of said different classes;

means for visualizing the distribution of said data points on a map in at least two dimensions using an output device coupled to said computer;

means for clustering said data points on said map provided by said visualizing means into clusters in accordance with the classes associated with said data points;

means for partitioning said map provided by said visualizing means into regions by defining boundaries between said clusters interactively with the user; and means for configuring said artificial neural network in accordance with said data points, said cluster, said boundaries, and said regions, in which each of said boundaries defines a different one of the artificial neurons of said artificial neural network.

2. The system according to claim 1 wherein said analyzing means comprises means for generating vectors in accordance with said input data to represent said data points.

3. The system according to claim 2 wherein said visualizing means comprises means for plotting said vectors on said map to form said data points in at least two dimensions.

4. The system according to claim 3 wherein said plotting means comprises means for adjusting the distribution of said data points utilizing scaling factors in one or more dimensions of said map.

5. The system according to claim 1 wherein said visualizing means further comprises means for assigning to each of said visualized data points a unique point name which includes the class associated with said data point, and visualizing said unique point name on said map as display codes.

6. The system according to claim 1 wherein said clustering means further comprises:

means for forming clusters of data points on said map of the same class; and means for assigning a unique cluster name for each cluster.

7. The system according to claim 1 wherein said boundaries are assigned unique names.

8. The system according to claim 1 wherein said boundaries are linear when said map is two-dimensional, and planar when said map is three-dimensional.

9. The system according to claim 1 wherein said partitioning means further comprises means for superimposing half-spaces over the map and numerically defining said boundaries in terms of said half-spaces.

10. The system according to claim 1 further comprising means for determining for each of said boundaries a weight vector and bias in accordance with said data points on said map.

11. The system according to claim 1 wherein each of said boundaries represents a different artificial neuron of said artificial neural network, and said geometric relationship of said clusters to said boundaries on said map defines the logic connectivity of said artificial neurons.

12. The system according to claim 11 wherein said configuring means further comprises means for establishing input nodes connected to one or more of said artificial neurons defined by said boundaries, and output nodes coupled to one or more of said artificial neurons.

13. The system according to claim 12 wherein said configured artificial neural network has at least one layer of connected artificial neurons.

14. The system according to claim 1 wherein a plurality of said maps are generated based on said input data, and each of said maps being operated upon by said visualizing means, said clustering means, said partitioning means, and said configuring means.

15. The system according to claim 1 further comprising means for reanalyzing said input data to generate data points for said visualizing means to visualize another one of said maps when said clustering means is not operative to provide separate ones of said clusters.

16. A method for building an artificial neural network of artificial neurons using input data representing patterns of different classes of signals comprising the steps of:

analyzing said input data to generate one or more data points in at least two dimensions representative of said signals in each of said different classes;

visualizing said data points on a map in at least two dimensions;

clustering said data points on said map provided by said visualizing step into clusters in accordance with said different classes associated with said data points;

partitioning said map provided by said visualizing step into different regions by defining boundaries between said clusters; and configuring said artificial neural network of artificial neurons in which said boundaries of said map define said artificial neurons, wherein at least said partitioning step is carried out with the aid of a user.

17. The method according to claim 16 wherein said analyzing step further comprises the step of generating vectors in accordance with said input data to represent said data points.

18. The method according to claim 17 wherein said visualizing step further comprises the step of plotting said vectors on said map to form said data points in at least two dimensions.

19. The method according to claim 18 wherein said plotting step further comprises the step of adjusting the distribution of said data points utilizing scaling factors in one or more dimensions of said map.

20. The method according to claim 16 wherein said visualizing step further comprises the steps of assigning to each of said visualized data points a unique point name which includes the class associated with said data points, and visualizing said unique point name on said map as display codes.

21. The method according to claim 16 wherein said clustering step further comprises the steps of:

forming clusters of data points on said map of the same class; and assigning a unique cluster name for each cluster.

22. The method according to claim 16 wherein said boundaries are assigned unique names.

23. The method according to claim 16 wherein said boundaries are linear when said map is two-dimensional, and planar when said map is three-dimensional.

24. The method according to claim 16 wherein said partitioning step further comprises the step of superimposing half-spaces over the map and numerically defining said boundaries in terms of said half-spaces.

25. The method according to claim 16 further comprising the step of determining for each of said boundaries a weight vector and bias in accordance with said data points on said map.

26. The method according to claim 16 wherein each of said boundaries represents a different artificial neuron of said artificial neural network, and said geometric relationship of said regions on said map to said classes defines the logic connectivity of said artificial neurons.

27. The method according to claim 16 wherein said configuring step further comprises the step of establishing input nodes connected to one or more of said artificial neurons defined by said boundaries, and output nodes coupled to one or more of said artificial neurons.

28. The method according to claim 27 wherein said configured artificial neural network has at least one layer of connected artificial neurons.

29. The method according to claim 16 wherein a plurality of said maps are generated based on said input data, and each of said maps being operated upon by said visualizing step, said clustering step, said partitioning step, and said configuring step.

30. The method according to claim 16 further comprising the step of reanalyzing said data to generate data points for said visualizing step to visualize another one of said maps when said clustering step is not operative to provide separate ones of said clusters.

31. A method of building an artificial neural network using an input data set comprising the steps of:

creating at least one multi-dimensional map of the input data set by analyzing the geometrical relationships of said input data;

clustering the input data on the map according to different classifications of said input data;

partitioning the map into regions by defining linear boundaries to verify boundary margins of the input data corresponding to the classifications with the aid of a user;

forming artificial neurons corresponding to said linear boundaries;

configuring a network based on relationship between regions defined by said boundaries margins and the class indicators to provide a network as multiple segments of at least one layer; and calculating synapse weights and thresholds of said artificial neurons based on the form of said linear boundaries.

32. The system according to claim 1 wherein said clusters are graphically defined on said map provided by said visualizing means.

33. The system according to claim 1 wherein said boundaries are graphically defined on said map provided by said visualizing means between said clusters.

34. The method according to claim 16 wherein said clustering step is carried out graphically on said map provided by said visualizing step to locate said clusters on said map.

35. The method according to claim 16 wherein said partitioning step is carried out graphically on said map provided by said visualizing step to locate boundaries between said clusters.

36. The system according to claim 1 further comprising means for non-iteratively determining the weights of the artificial neurons in accordance with the map.

37. The system according to claim 1 wherein said means for analyzing said input data is in accordance with the geometric relationships of the input data.

38. The system according to claim 1 wherein said input data represents a data matrix of columns, and said analyzing means comprises means for transforming the columns of the matrix into data points capable of being visualized on the map in at least two dimensions such that said data points representative of patterns of the same class can be clustered by said clustering mean.

39. The method according to claim 16 wherein said analyzing step analyzes said input data in accordance with the geometric relationships of the input data.

40. The method according to claim 16 wherein said clustering step is carried out before said partitioning step.

* * * * *